(12) United States Patent
Han et al.

(10) Patent No.: US 8,880,341 B2
(45) Date of Patent: Nov. 4, 2014

(54) METHOD AND APPARATUS FOR DISPLAYING THREE-DIMENSIONAL TERRAIN AND ROUTE GUIDANCE

(71) Applicant: Alpine Electronics, Inc., Tokyo (JP)

(72) Inventors: Maung Han, Torrance, CA (US); Benjamin Poiesz, San Jose, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 13/743,154

(22) Filed: Jan. 16, 2013

(65) Prior Publication Data
US 2013/0131978 A1   May 23, 2013

Related U.S. Application Data

(63) Continuation-in-part of application No. 12/871,026, filed on Aug. 30, 2010, now Pat. No. 8,532,924.

(51) Int. Cl.
| | |
|---|---|
| *G01C 21/00* | (2006.01) |
| *G08G 1/123* | (2006.01) |
| *G09G 5/00* | (2006.01) |
| *G06T 15/20* | (2011.01) |
| *G01C 21/36* | (2006.01) |
| *G06T 17/05* | (2011.01) |

(52) U.S. Cl.
CPC ......... *G01C 21/3638* (2013.01); *G06T 2210/36* (2013.01); *G06T 15/20* (2013.01); *G06T 17/05* (2013.01); *G01C 21/3635* (2013.01)

USPC .............. 701/446; 340/995.11; 345/581

(58) Field of Classification Search
USPC .............. 701/400–541; 340/988–996, 995.1, 340/995.11, 142, 149, 998, 980, 995.2; 348/148, 143; 345/7, 582, 581, 417, 345/420, 412, 586, 647; 382/181, 104
See application file for complete search history.

(56) References Cited

U.S. PATENT DOCUMENTS

| | | | |
|---|---|---|---|
| 6,285,317 B1 | 9/2001 | Ong | |
| 7,039,521 B2 | 5/2006 | Hortner et al. | |
| 2008/0074312 A1* | 3/2008 | Cross et al. | 342/25 A |
| 2009/0171581 A1* | 7/2009 | Ushida et al. | 701/211 |
| 2009/0187335 A1* | 7/2009 | Muhlfelder et al. | 701/200 |
| 2010/0007669 A1* | 1/2010 | Bethune et al. | 345/520 |

* cited by examiner

Primary Examiner — Muhammad Shafi
(74) Attorney, Agent, or Firm — Muramatsu & Associates

(57) ABSTRACT

A display method and apparatus for displaying three-dimensional terrains and route guidance achieves a flexible and high detail three-dimensional display operation by enabling to change parameters, such as a viewing angle of a selected three-dimensional object, a height of a selected three-dimensional object, and a level of details (LOD) of a selected part of the image. The display method and apparatus also enables to compensate discontinuity, if any, at a border portion of two or more images where such parameters have been changed. Since such a change is made only a selected portion or object on the three-dimensional image, a computation power, memory space or other resources of the navigation system may not be overburdened by such operations.

20 Claims, 25 Drawing Sheets

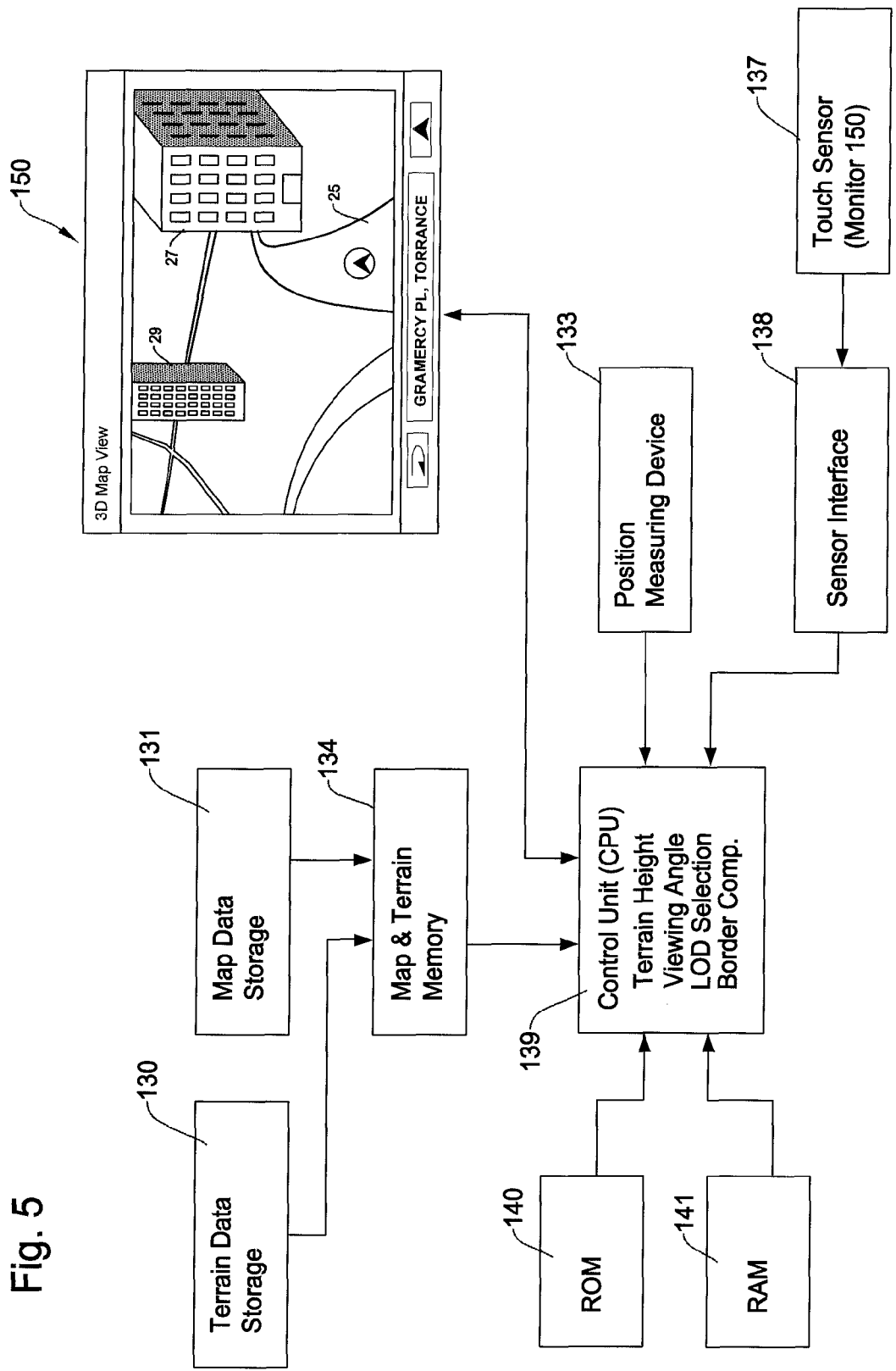

2D view of point (x,y) on terrain mesh 3D view of point (x,y) on terrain mesh

Fig. 10B
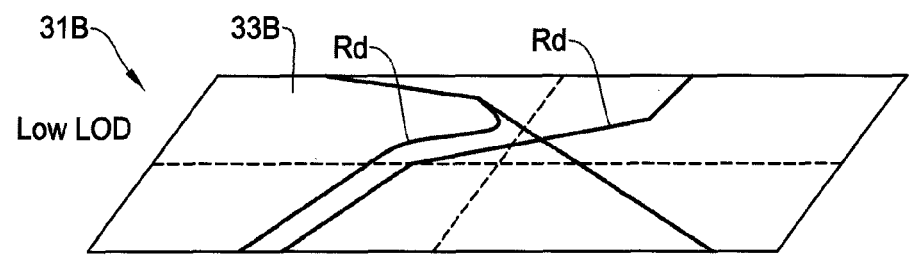
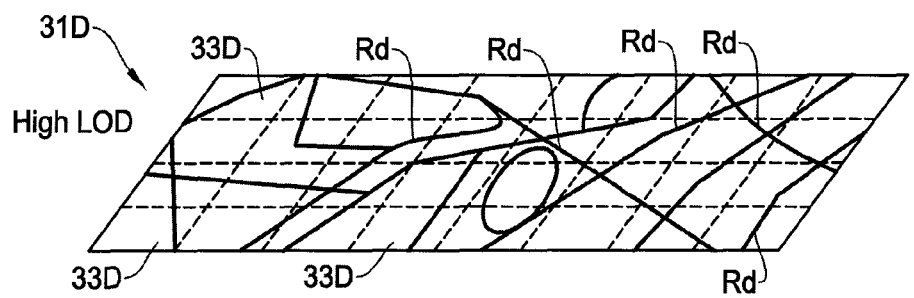
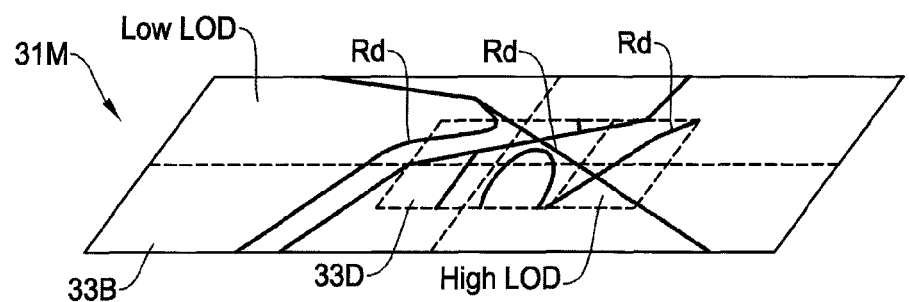

Fig. 12
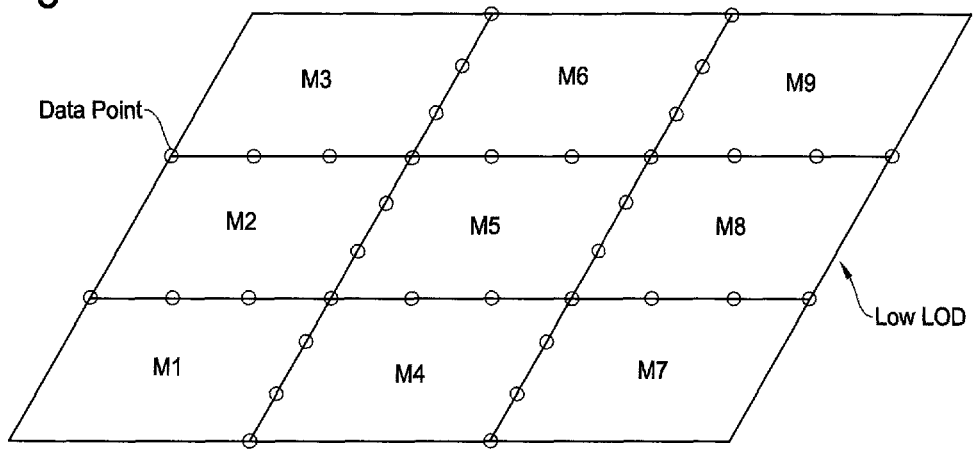
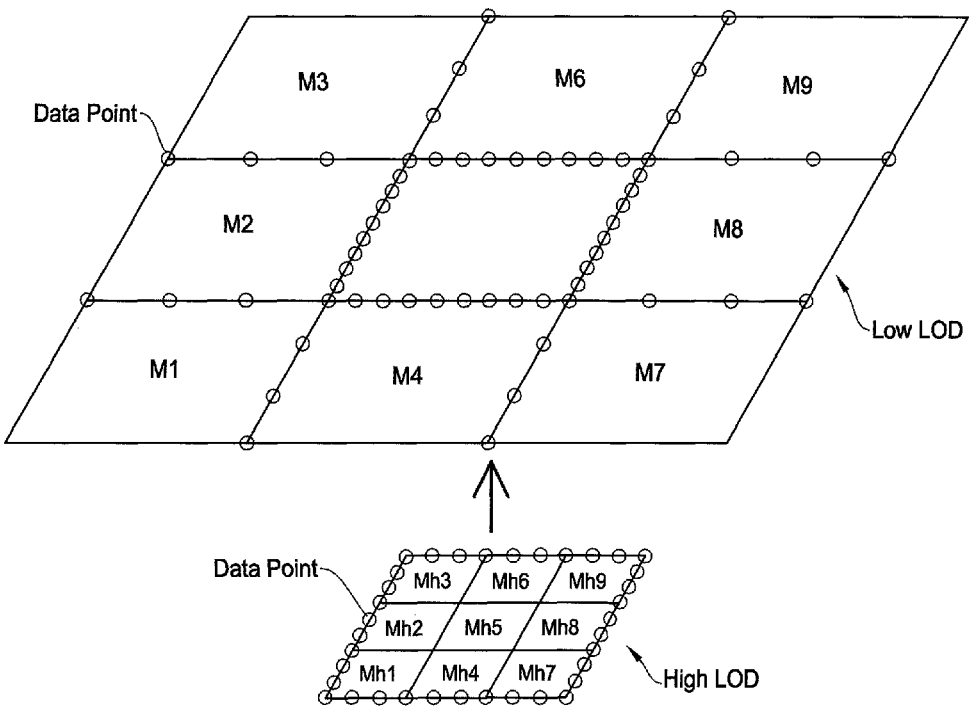

METHOD AND APPARATUS FOR DISPLAYING THREE-DIMENSIONAL TERRAIN AND ROUTE GUIDANCE

CROSS-REFERENCE TO RELATED APPLICATIONS

This application is a continuation-in-part of U.S. patent application Ser. No. 12/871,026 filed Aug. 30, 2010 which claims priority under 35 USC §119(e) to U.S. Provisional Patent Application No. 61/239,400, filed Sep. 2, 2009, the entire contents of which are incorporated herein by reference.

TECHNICAL FIELD

This invention relates to a display method and apparatus for use in a navigation system, and more particularly, to a method and apparatus for displaying three-dimensional terrain and route guidance with dynamic control of a different viewing angle, height, and level of details of an object in the three-dimensional images on the display screen.

BACKGROUND

With remarkable advances in computer and semiconductor technologies, electronic devices, such as media players, gaming devices, cellular phones, navigational devices, etc., have become more popular and affordable for most users. In these electronic devices, there is a prevailing trend for three-dimensional display to provide the user with a better visual enjoyment and understanding than traditional two-dimensional display.

In some navigation devices and systems with so-called "three-dimensional" display, there is typically a two-dimensional overlay showing turns or maneuvers in a static, but detailed image. Such an approach requires the user to translate this two-dimensional view into the three-dimensional reality which the users see the surroundings and a guidance route directly or through a vehicle windshield. This may cause confusion in routing situations where two or more turns are closely spaced together with roads which are not part of the guidance route.

For example, U.S. Pat. No. 6,285,317 issued to Ong discloses a navigation system for a ground vehicle which incorporates a three-dimensional display updated with information from a wireless service provider. However, the three-dimensional display disclosed by Ong is directed simply to a real environmental scene overlaid with a three-dimensional turn icon.

Furthermore, U.S. Pat. No. 7,039,521 issued to Hortner et al. discloses a method and device for displaying driving instructions. More particularly, when calculating the perspective view from the viewpoint of the user, the inclination of the vehicle about its longitudinal and lateral axes relative to the road surface is taken into account, as is the incline of the road or the three-dimensionality of the terrain. However, like Ong, Hortner merely discloses three-dimensional driving instructions overlaying on real-time images taken by a camera.

Conventionally, displaying road and polygon (map) information over three-dimensional terrain poses difficult challenges. For example, the roads may "dig into" or "fly above" the terrain proximate to them. In other words, if a long road segment crosses a hill or valley, it is very likely that the road no longer appears connected to the ground of the terrain. The road may be under or over the terrain surface, which may cause visual discomfort for the user. One solution is proposed to dynamically generate roads which conform to the terrain below, over different levels of detail (LOD). However, showing high LOD terrains and road images requires a large amount of memory and a high processing capability.

Therefore, there remains a need for a display method and apparatus to provide three-dimensional route guidance in a three-dimensional rendering environment with dynamic control of level of details, viewing angles, and heights of objects without high computation requirements.

SUMMARY OF DISCLOSURE

It is an object of the present application to provide a method for displaying three-dimensional images of maps and terrains and a display apparatus using this method in which parameters of a selected object of the three-dimensional images can be changed freely without requiring a high level of computation power.

It is another object of the present application to draw a high detail road and polygon data over three-dimensional images of terrain, without the need for data of detailed vertices which consume large amounts of memory and processing capability.

It is another object of the present application to provide a more realistic guidance environment coupled with a high performance three-dimensional map rendering, which increases visibility and understanding of complex guidance maneuvers.

It is another object of the present application to improve performance when drawing large areas of terrain, without requiring traditional control schemes for level of details or a large memory capacity and processing power.

It is still another object of the present application to increase user visibility when viewing the three-dimensional objects close to the ground and parallel to the ground surface or with varying viewing angles.

According to one aspect, a method for displaying three-dimensional terrains and route guidance for a navigation system includes the steps of: providing a terrain database which stores terrain data representing three-dimensional geographical information on terrains arranged for a purpose of navigation operation; providing a map database which stores map data representing three-dimensional map information on routes and road networks, the map data being arranged to interrelate with the terrain data; retrieving, by using a processor, the terrain data from the terrain database and the map data from the map database for three-dimensional display; displaying three-dimensional images of the routes and terrains on a monitor based on the retrieved terrain data and map data; and changing a parameter of the three-dimensional image of a selected object displayed on the monitor where the parameter includes a height, a viewing angle, and a level of details (LOD) of the selected object.

In the method for displaying three-dimensional terrains and route guidance noted above, the step of providing the terrain database includes steps of: retrieving topographic map data available in a public domain; converting the topographic map data for a purpose of navigation operation by changing color data to grayscale data which represent elevation information of a terrain, and configuring the terrain database in a form of a plurality of terrain meshes where each terrain mesh is defined by a plurality of data points each representing a grayscale of a terrain.

In the method for displaying three-dimensional terrains and route guidance noted above, the step of providing the map database includes steps of: configuring the map data in a multi-layered structure where a plurality of data layers with different levels of details (LODs) are arranged in a hierarchy manner where each data layer is configured by a plurality of map meshes each being defined by a plurality of data points; and modifying the map data to be compatible with the terrain data with respect to height such that a vertex of each road matches a corresponding height of the terrain at a most proximate location with one another so that a road follows contours of the terrain.

In one embodiment, the step of changing the parameter of the three-dimensional image of the selected object includes a step of allowing a user to change the parameter of the three-dimensional image freely and continuously. In another embodiment, the step of changing the parameter of the three-dimensional image of the selected object includes a step of allowing the navigation system to automatically change the parameters of the three-dimensional image based on predetermined conditions.

In the method for displaying three-dimensional terrains and route guidance noted above, the step of changing the parameter of the three-dimensional image of the selected object includes a step of either displaying a tool for the user to change the parameter where the tool includes icons of an indicator and an arrow related to the parameter or allowing the user to change the parameter by finger actions of the user on a touch sensor on the monitor without displaying the tool.

In the method for displaying three-dimensional terrains and route guidance noted above, the step of changing the parameter of the three-dimensional image of the selected object includes a step of displaying a three-dimensional image of an object that was not visible before changing the parameter because the object was hidden by the three-dimensional image of the selected object.

In the method for displaying three-dimensional terrains and route guidance noted above, the step of changing the parameter of the three-dimensional image of the selected object includes a step of conducting a border compensation operation at a boarder of images when the border suffers discontinuity of images as a result of the changes of the parameter.

In one embodiment, the step of conducting the border compensation operation includes a step of replacing the data points of a lower LOD terrain or map mesh with the data points of a corresponding higher LOD terrain or map mesh, and a step of combining the meshes of different LOD thereby stitching two or more images of different LODs. In another embodiment, the step of conducting the border compensation operation includes a step of adjusting grayscales of the data points at the boarder suffering the discontinuity of images to be identical to one another, and a step of conducting an interpolation operation for an intermediate region between the data point whose grayscale has been adjusted and an arbitrally selected data point.

In another aspect, the display apparatus for displaying three-dimensional terrains and route guidance is configured to implement the various operational steps noted above with respect to the display method. The display apparatus includes: a terrain database which stores terrain data representing three-dimensional geographical information on terrains arranged for a purpose of navigation operation; a map database which stores map data representing three-dimensional map information on routes and road networks, the map data being arranged to interrelate with the terrain data; a control unit for controlling an overall operation of the display apparatus, the control unit retrieving the terrain data from the terrain database and the map data from the map database for three-dimensional display; and a monitor which displays three-dimensional images of the routes and terrains based on the retrieved terrain data and map data; where the display apparatus is configured to allow a user to change a parameter of the three-dimensional image of a selected object displayed on the monitor where the parameter includes a height, a viewing angle, and a level of details (LOD) of the selected object.

According to the embodiments disclosed by the present application, the method and system achieves a flexible and high detail three-dimensional display by enabling to change parameters, such as a viewing angle of a selected three-dimensional object, a height of a selected three-dimensional object, and a level of details (LOD) of a selected part of the image. The method and system also enables to compensate discontinuity, if any, at a border portion of two or more images where such parameters have been changed. Since such a change is made only a selected portion or object on the three-dimensional image, a computation power, memory space or other resources of the navigation system may not be overburdened by such operations.

BRIEF DESCRIPTION OF THE DRAWINGS

FIG. 5 is a functional block diagram showing an example of structure of a display apparatus with a navigation function for displaying three-dimensional terrains and route guidance operations.

FIG. 7A shows a two-dimensional image thereof when changing the viewing point to an upright position of the three-dimensional object and FIG. 7B shows a three-dimensional image thereof when changing the viewing point of the object with respect to a parameter of angle and/or height except for the upright position of FIG. 7A.

FIG. 8A shows an example of angle indicator 63a and scroll arrow 65a used in the screen example of FIG. 2A, and FIG. 8B shows an example of height indicator 63b and scroll arrow 65b used in the screen example of FIGS. 2B and 3A. FIG. 8C shows an example of LOD indicator 63c and scroll arrow 65c to select a desired level of details of the three-dimensional image such as road maps on the screen.

FIG. 9A is directed to a finger action to change the viewing angle of the object and FIG. 9B is directed to a finger action to change the height of the object.

FIGS. 10A and 10B are schematic diagrams showing examples of multiple data layer of the map data used in the navigation system where each data layer is configured by data divided in the form of meshes, roads of various classes, road links, nodes, etc., where FIG. 10A shows an example of multiple data layers with different levels of details (LOD) and FIG. 10B shows an example in which a part of the map data of higher LOD is combined with the map data of lower LOD.

FIG. 11A shows discontinuities that may arise in such a situation and FIG. 11B is perspective view showing the relationship between the low LOD meshes and the high LOD meshes.

FIG. 12 is a schematic diagram showing an example of method for correcting the discontinuity which arises in the situation of FIGS. 11A and 11B when a part of the map image is replaced with the map image of different LOD.

DETAILED DESCRIPTION OF THE PREFERRED EMBODIMENTS

Figure 1A:
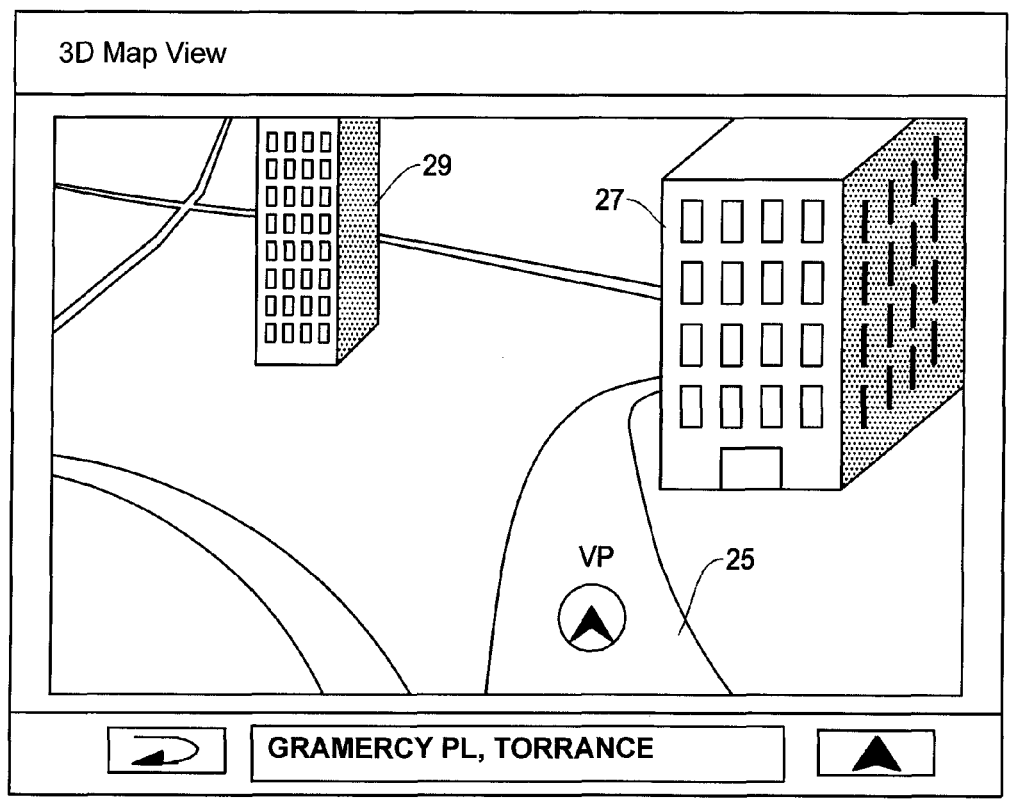
FIG. 1A is an example of screen display of a navigation system showing three-dimensional images of buildings and routes in which a part of the road essential to a user is invisible because of a building.

The embodiments disclosed here relate to an apparatus and method for displaying three-dimensional terrain and route guidance for a navigation purpose. The display method and apparatus for three dimensional terrain and route guidance in the present embodiment is mainly described for a case where the display method and apparatus is implemented in a form of a vehicle navigation system or a portable navigation device. However, the display method and apparatus disclosed here is also applicable to other electronics devices having a navigation function such as a cellular phone (smart phone), a PDA (portable digital assistant), a tablet terminal, a laptop computer, a wrist watch, etc. Note that, in the following descriptions, "display apparatus" and "navigation system" may be interchangeably used.

As stated above, displaying road and polygon information (map images) over three-dimensional terrain poses difficult challenges. For example, there arises a problem in that the roads may "dig into" or "fly above" the terrain proximate to them. This typically means that if a road segment crosses a hill or valley, it is likely that the road no longer appears connected to the ground and the road may be under or over the terrain surface, which may cause visual discomfort and confusion to the user.

One of the reasons of this problem is that the terrain data showing land shapes or topographic map and the map data showing roads and polygons (building footprints, etc.) are made by different sources and both of the data do not perfectly match with one another. For example, vertices (points defining polygons) of the terrain and vertices of the roads may be defined at different locations in different manners. Since the vertices do not match with one another, the three-dimensional images of the terrain and roads look disconnected especially when viewing them closer or with high level of details.

The embodiments disclosed by the present application provide solutions to such problems by changing a viewing angle of a selected three-dimensional object, by changing a height of a selected three-dimensional object, and/or by changing only a selected part of the map image to a different level of details (LOD) while compensating discontinuity of the border portion of the modified images. Since such a change is made only to a selected portion or object on the three-dimensional image, the computation power, memory space or other resources of the navigation system may not be overburdened by such operations.

Further, in the three-dimensional display incorporated in the navigation system, images of the roads important to the user may be hidden by an image of a terrain, a building, etc. Namely, depending on the size and shape of a mountain, building, or other object, the roads that exist behind the object may become invisible in the three-dimensional display. Such an example is shown in FIGS. 1A and 1B in which a route for guiding a user to reach the destination becomes invisible in the three-dimensional display because it is hidden by the terrain or building.

Figure 1B:
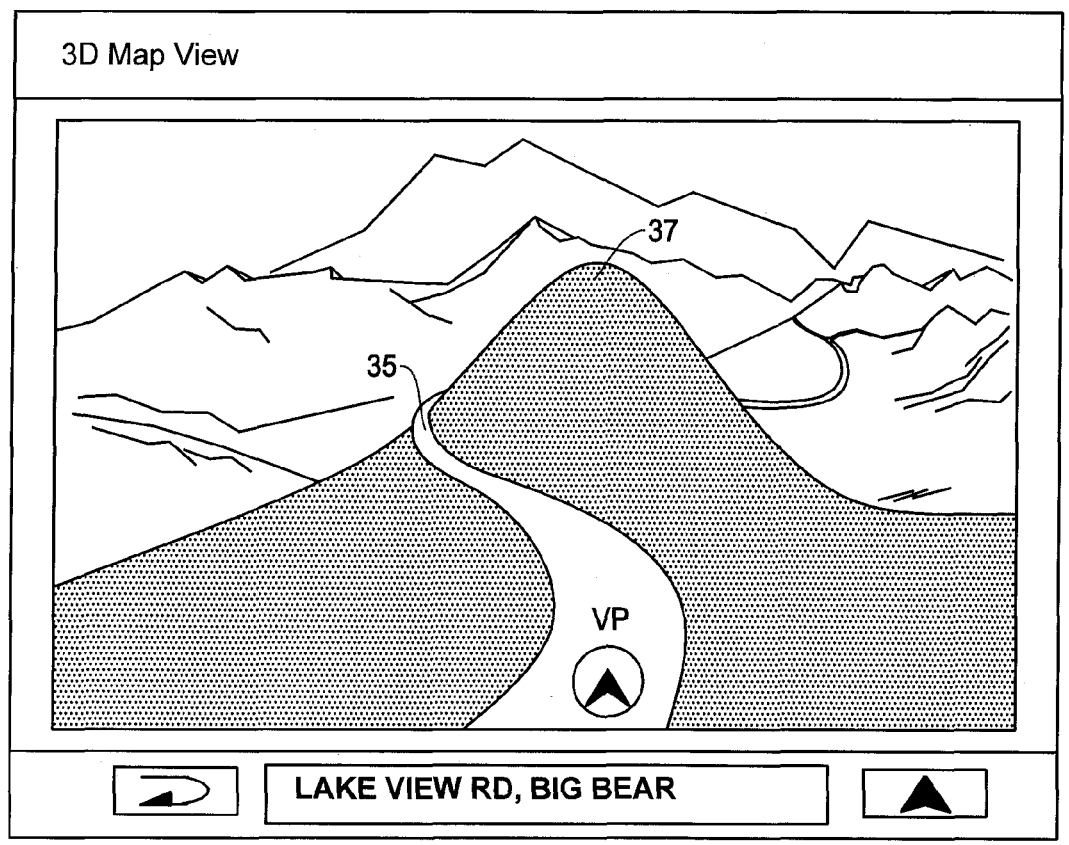
FIG. 1B is an example of screen display of a navigation system showing three-dimensional images of terrains and routes in which a part of the road essential to the user is invisible because of a mountain.

In the three-dimensional display of FIG. 1A, a current position VP (vehicle position) of a vehicle or user is indicated on a road 25 which is typically a part of a guidance route to the destination calculated by the navigation system. As shown, a front part of the road 25, further away from the user, is hidden by a building 27 as in a manner the user actually sees the surroundings and the guidance route directly or through a vehicle windshield. Similarly, in the three-dimensional display of FIG. 1B, a front part of the road 35 on which the current position VP of the vehicle or user is illustrated is hidden by a mountain 37. In either case, the user may be frustrated and uneasy since the ahead of the guidance route is invisible.

According to the embodiments disclosed by the present application, since the viewing angle and/or the height of the selected three-dimensional object (mountain, building, etc.) can be freely adjusted, the roads hidden by such an object can become visible. For example, with respect to the situation shown in FIG. 1A, the embodiments enable the hidden roads to be visible by changing the viewing angle of the building 27 through the manner shown in FIGS. 2A and 4A. Further, with respect to the situation shown in FIG. 1B, the embodiments enable the hidden roads to be visible by changing the height of the mountain 37 through the manner shown in FIGS. 3A-3B and 4B.

Figure 2A:
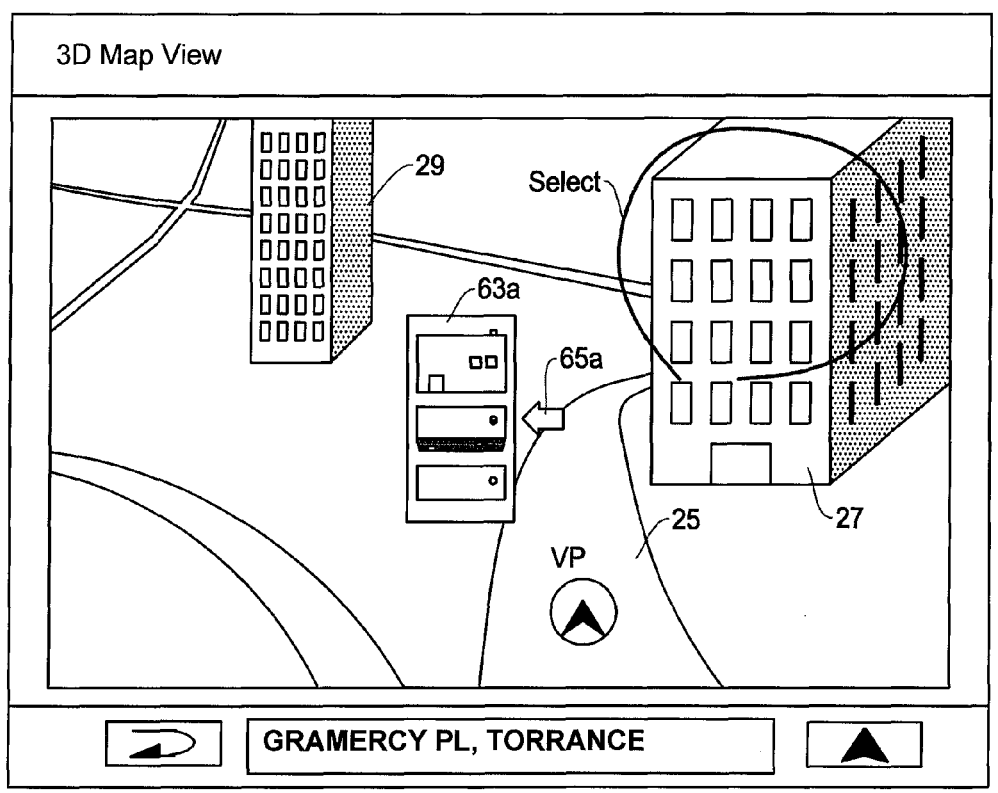
FIG. 2A is an example of screen display corresponding to that of FIG. 1A in which a building is selected and an angle indicator is displayed to allow the user to continuously change the viewing angle of the selected building.

As noted above, in the embodiments, the user can change only a selected object on the three-dimensional display in its viewing angle, height, or a level of details. In the example of FIG. 2A, since the building 27 makes the ahead of the road 25 invisible, the user selects the building 27 by, for example, a circle action on the monitor (touch screen) to change its viewing angle. Then, the navigation system displays an angle indicator 63*a* and a scroll arrow 65*a* on the three-dimensional display, i.e., a tool for changing the parameter (viewing angle). The angle indicator 63*a* includes icons showing different levels of viewing angles. This arrangement allows the user to continuously change the viewing angle of the building 27 by moving the scroll arrow 65*a* along the angle indicator 63*a* up or down.

The display apparatus (navigation system) is configured to allow the user to change the viewing angle, for example, by 90 degrees, from parallel to the ground (three-dimensional) to perpendicular to the ground (two-dimensional). To do this, in one embodiment, the user may place the finger on the scroll arrow 65*a* and slide the finger to move the scroll arrow 65*a* in an up/down direction to select the desired viewing angle of the selected object. In another embodiment, the user may operate a remote controller or other input device to point a cursor to the scroll arrow 65*a* and move the cursor to drag the scroll arrow 65*a* in the up/down direction to select the desired viewing angle of the selected object.

Figure 2B:
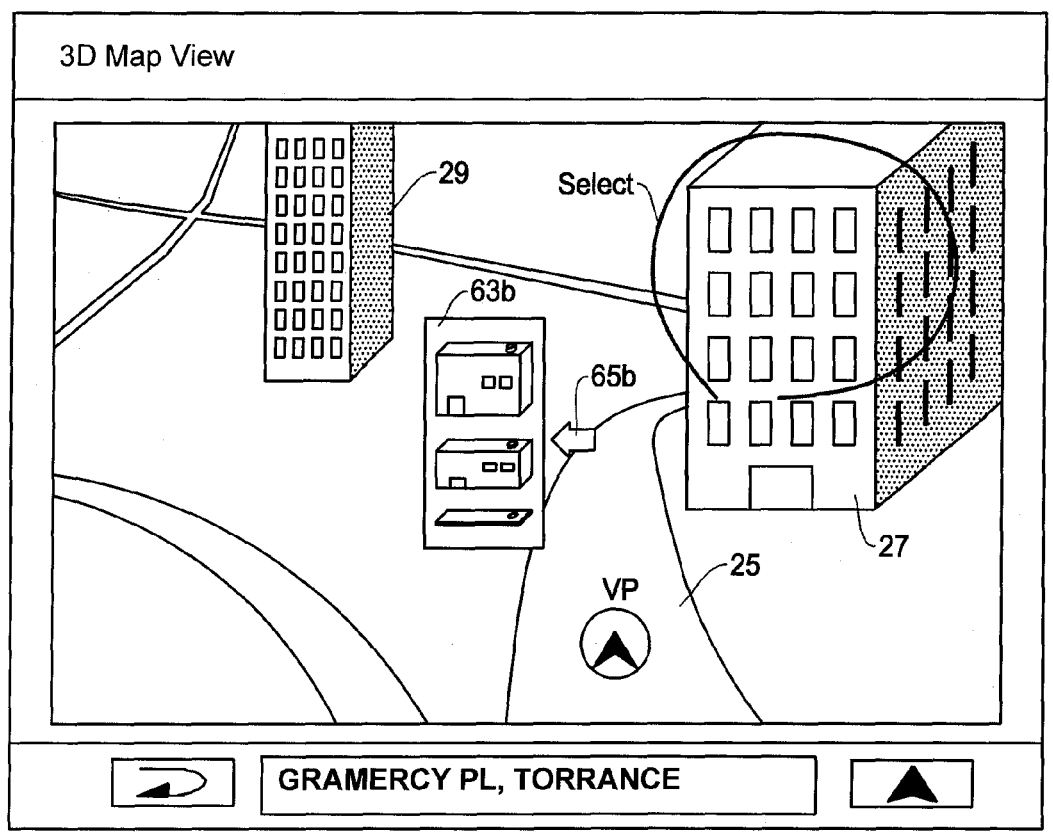
FIG. 2B is an example of screen display corresponding to that of FIG. 1A in which a building is selected and a height indicator is displayed to allow the user to continuously change the height of the three-dimensional image of the selected building.

Similarly, in the example of FIG. 2B, since the building 27 makes the ahead of the road 25 invisible, the user selects the building 27 by, for example, a circle action on the display screen (touch sensor) to change its height while the viewing angle of the building 27 remains unchanged. This is because if the height of the building becomes smaller, it is likely that the hidden road behind the building 27 will become visible. Then, the navigation system displays a height indicator 63*b* and a scroll arrow 65*b*, i.e., a tool for changing the parameter (height) on the three-dimensional display to allow the user to continuously change the height of the building 27. The height indicator 63*b* includes icons showing different levels of heights.

For example, the display apparatus is configured to allow the user to change the height of the selected object from 100% (full height) to 0% (zero height) by moving the scroll arrow 65*b* along the height indicator 63*b* up or down. Similar to the example of FIG. 2A, the user may place the finger on the scroll arrow 65*b* and slide the finger to move the scroll arrow 65*b* in an up/down direction to select the desired height of the selected object. Alternatively, the user may operate other input device such as a remote controller to point a cursor on the scroll arrow 65*b* and move the cursor to drag the scroll arrow 65*a* in the up/down direction to select the desired height.

Figure 4A:
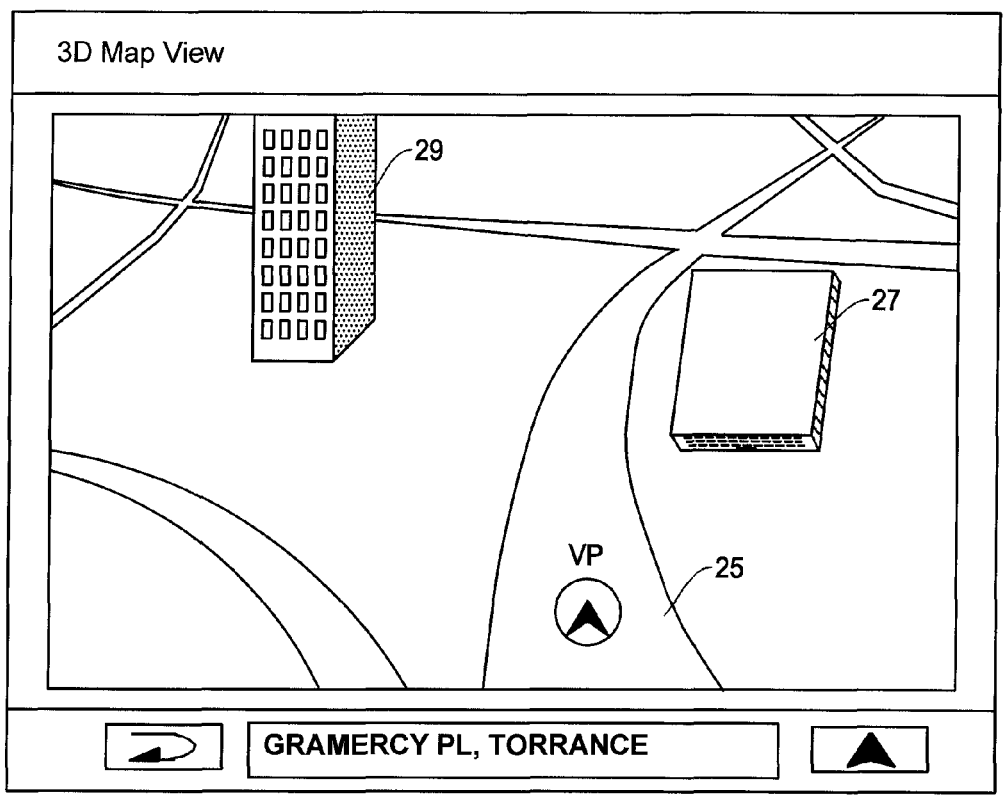
FIG. 4A is an example of screen display corresponding to that of FIG. 2A in which the viewing angle of the selected building has been increased such that the roads ahead of the user have now become visible.

FIG. 4A shows an example of result when the user changes the viewing angle of the building 27 in the three-dimensional display of FIG. 2A. The user has changed the viewing angle of the building 27 in such a way that the building 27 and its surrounding area are viewed from the position higher than that shown in FIG. 2A. In other words, in FIG. 4A, the building 27 and its surrounding area are illustrated in a manner closer to the two-dimensional display by dramatically increasing the viewing angle. As a result, the front portion of the road 25 and its relationship with other roads that have been invisible in FIG. 1A are now clearly visible, thereby enabling the user to drive the vehicle safely with comfort.

Figure 3A:
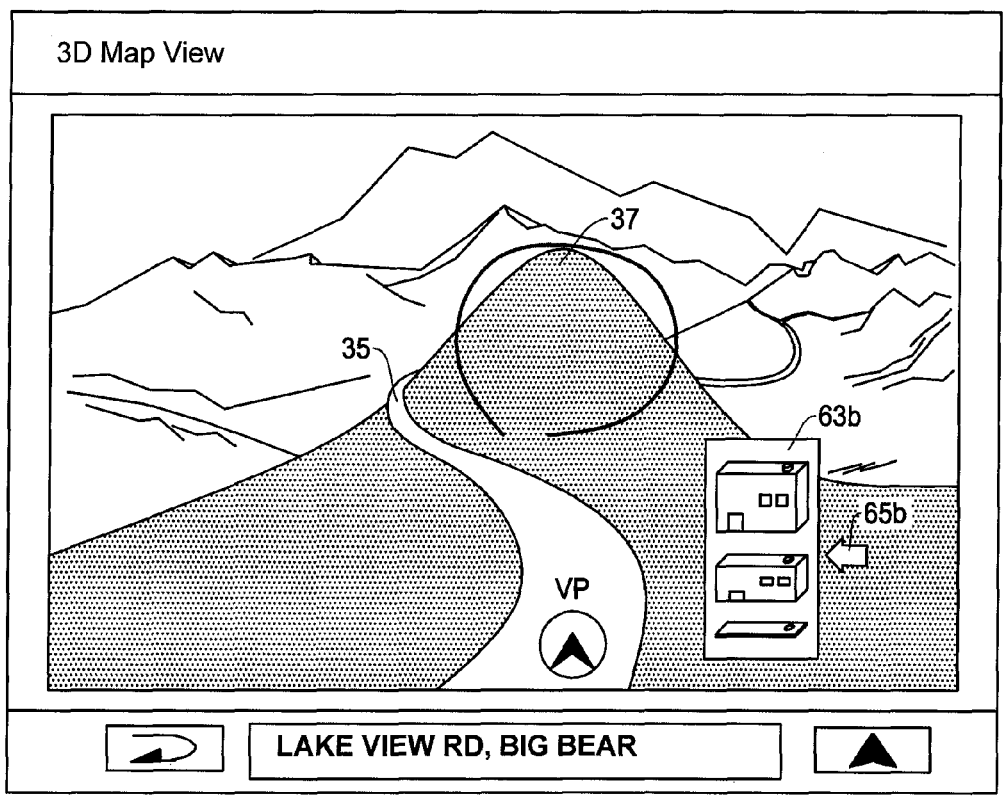
FIG. 3A is an example of screen display corresponding to that of FIG. 1B in which a mountain is selected and the height indicator is displayed to allow the user to continuously change the height of the three-dimensional image of the selected mountain.
Figure 3B:
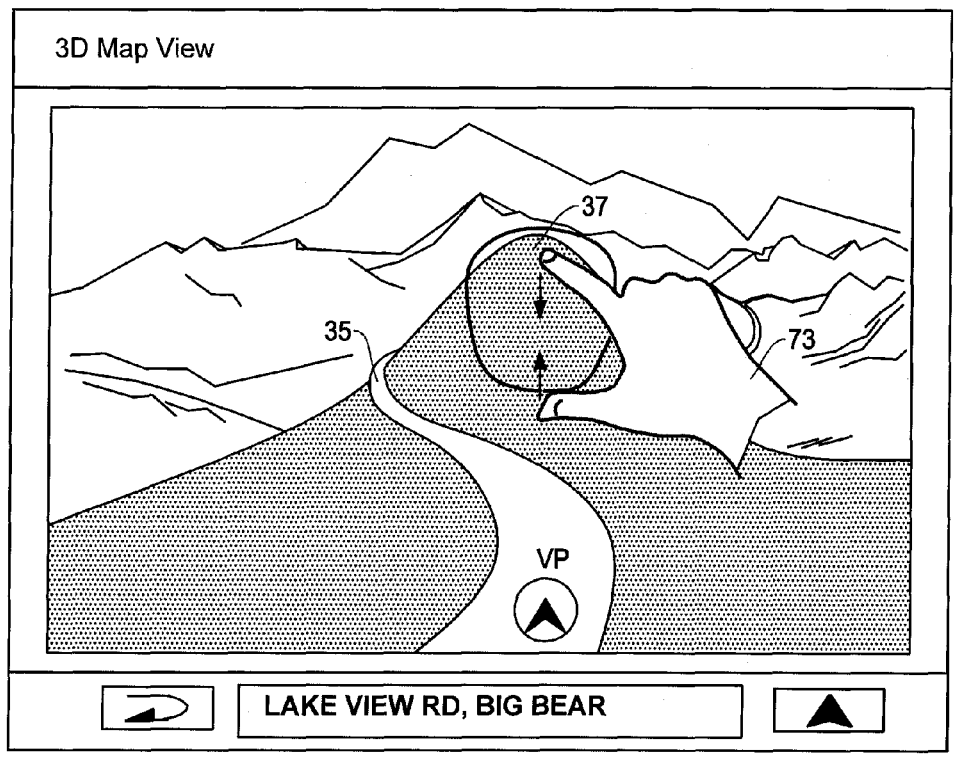
FIG. 3B is an example of screen display corresponding to that of FIG. 1B in which a mountain is selected to allow the user to continuously change the height of the three-dimensional image of the selected building by the user's up/down finger movement.

FIGS. 3A and 3B are directed to the situation related to that shown in the three-dimensional display of FIG. 1B where the front of the road (guidance route) 35 to the destination is hidden by the mountain 37. The embodiments of FIGS. 3A and 3B respectively provide ways of changing the height of the selected object, in this case, the mountain 37. As noted above, according to the embodiments disclosed by the present application, the user can freely change the height of the selected three-dimensional object, i.e., the mountain 37. Thus, it is expected that the front part of the road 35 can become visible when the user reduce the height of the mountain 37 by an appropriate amount.

In the example of FIGS. 3A and 3B, the user selects the mountain 37 as an object to change its height by, for example, a finger action in writing a circle on the surface of the monitor (touch screen). Then, as shown in FIG. 3A, similar to the example shown in FIG. 2B, the navigation system displays the height indicator 63*b* and the scroll arrow 65*b* on the three-dimensional display. Thus, the height indicator 63*b* and the scroll arrow 65*b* allow the user to continuously change the height of the mountain 37 by moving the scroll arrow 65*b* along the height indicator 63*b* in an up or down direction. In this case, since the user wants to see further ahead of the road 35 hidden by the mountain 37, he/she lowers the arrow 65*b* to reduce the height of the mountain 37.

In the example of FIG. 3B, the user changes the height of the selected mountain 37 by directly using his/her hand 73, i.e., a finger action or gesture on the monitor screen (touch sensor). In this case, since the user wants to reduce the height of the mountain 37 while maintaining the same viewing angle thereof, the user touches the fingers on the screen and moves them in a manner indicated by arrows (reduce the distance between the fingers). This type of user interface using the finger action may be preferable over the example shown in FIG. 3A, since the user interface using the finger action is intuitive, well known, and widely used today in navigation systems, cellular phones (smart phones), tablet terminals, etc.

FIG. 4A shows an example of the result when the user changes the viewing angle of the building 27 in the three-dimensional display of FIG. 2A. The user has changed the viewing angle of the building 27 in such a way that the building 27 and its surrounding area are viewed from the position higher than that shown in FIG. 2A. In other words, in FIG. 4A, the building 27 and its surrounding area are illustrated in a manner closer to the two-dimensional display by dramatically increasing the viewing angle. As a result, the front portion of the road 25 and its relationship with other roads that have been invisible in Figure 1A are now clearly visible, thereby enabling the user to drive the vehicle safely with comfort.

Figure 4B:
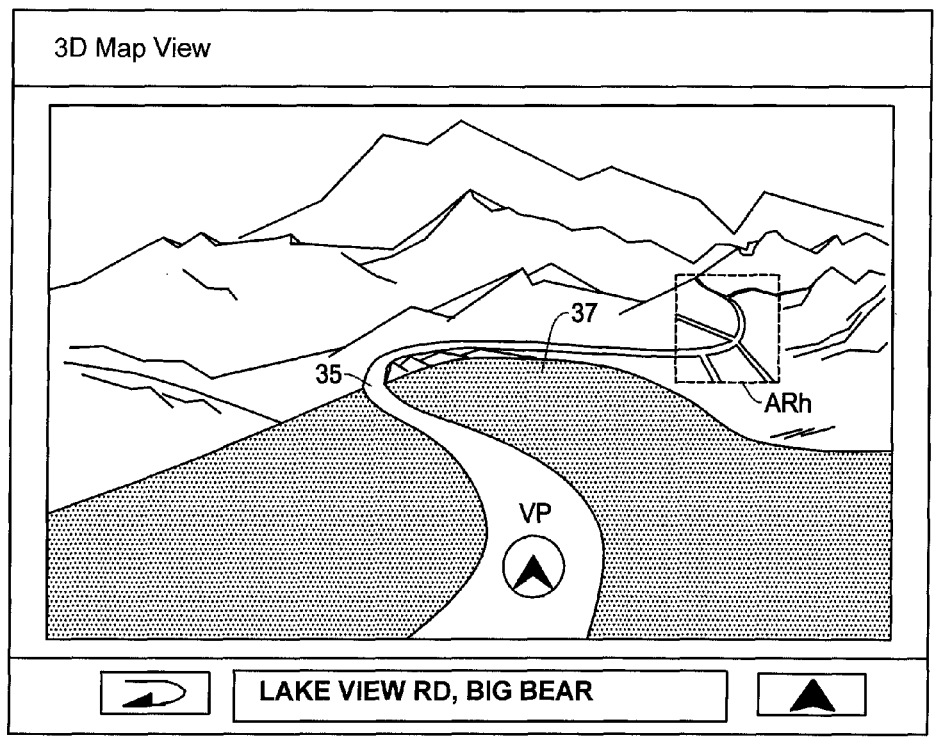
FIG. 4B is an example of screen display corresponding to that of FIGS. 3A and 3B in which the height of the selected mountain has been reduced such that the roads ahead of the user have now become visible.

Further in FIG. 4B, at the front of the route 35 across the mountain 37, there is an area ARh in which the map image is illustrated in more detail than that in the surrounding areas. Since the three-dimensional image of the mountain 37 is reduced in height, the route 35 originally hidden behind the mountain 37 is now visible, the user may want to know more details about the route 35 ahead. To meet such needs, the navigation system is designed to show a different level of details (LOD) for a particular area on the three-dimensional screen as shown in FIG. 4B, which will be described in more detail later.

FIG. 5 is a block diagram illustrating an example of structure of the display apparatus with navigation function for implementing the display method described above. In the embodiments, the display apparatus is designed to display the three-dimensional terrains and route guidance in addition to the conventional ways of displaying maps and navigation information. In a three-dimensional display mode, the display apparatus of FIG. 5 allows the user to change parameters involved in the image, such as a viewing angle of a selected three-dimensional object, a height of a selected three-dimensional object, and a level of details of a selected part of the map image. During this operation, the display apparatus compensates discontinuity at a border portion between the selected three-dimensional object and other objects, or between the selected part of the map image and the other map image.

As can be seen in FIG. 5, the display apparatus includes a terrain data storage (terrain database) 130 for storing three-dimensional terrain data, a map data storage (map database) 131 for storing map data, and a memory 134 to store an amount of data retrieved from the terrain data storage 130 and the map data storage 131 that are necessary for current operations. Typically, the three-dimensional terrain data is retrieved, for a purpose of navigation operation, from topographic map raw data created by USGS (United States Geographical Survey) that is in the public domain. The retrieved raw data is converted to a format to be used by the display apparatus of FIG. 5 or other devices with navigation functions. The three-dimensional terrain data is parsed and converted to the format and compatible with the navigation system as will further be described with reference to FIG. 6.

Typically, the map data in the map data storage 131 is originally created by a map data supplier and is converted, for example, by a navigation system supplier, to a format appropriate for the navigation systems. Typically, in addition to the map data, the map data storage 131 usually stores other information such as point of interest (POI) data, traffic regulation data, photography data for each location, etc., for achieving improved navigation functionalities. Further, with respect to the embodiments, the data in the map data storage 131 is further processed to be compatible with the terrain data in the terrain data storage 130 as will be described later.

A position measuring device 133 is incorporated for measuring a current user position such as his/her vehicle position for achieving a route guidance operation. Based on the current position, the navigation system is able to find the relationship between the destination and the current position, the remaining route to the destination, cross streets on the remaining route, etc. so as to conduct the route guidance.

Typically, the position measuring device 133 has a GPS (global positioning system) receiver for detecting a global position based on received GPS signals from satellites, a speed sensor for detecting a moving distance based on the speed, a gyroscope for detecting a moving direction, and a microprocessor for calculating the user's current position using the above detected information.

The block diagram of FIG. 5 includes a monitor 150 as a display unit, typically, a liquid crystal display (LCD) unit, which functions as a graphic user interface (GUI). A touch sensor 137 is provided as an input device to input instructions such as a destination, selection of a point of interest, specifying a parameter such as a viewing angle and height of three-dimensional object, etc. by a user. Typically, the touch sensor 137 is formed on a screen surface of the monitor 150 so that the user touches, taps, and drags a displayed menu, mark, or button on the monitor screen to input or select desired information. A sensor interface 138 interprets the operation on the touch sensor 137 by the user based on locations on the screen, time lengths, numbers of tapping, directions, etc. of the finger movements on the monitor screen 150 made by the user.

The display apparatus of FIG. 5 further includes a control unit (CPU, processor) 139 for controlling an overall operation of the navigation functions as well as dynamically displaying the information concerning the three-dimensional terrain and map images. Especially, the control unit 139 is configured by a plurality of functional units (or separate functional units as in the block diagram of FIG. 19) to achieve the unique functions of embodiments disclosed by the present application. Such functions include changing a height of the object, changing a viewing angle of the object, selecting a level of details, and compensating border discontinuity, as will be described in more detail later. A ROM 140 is provided for storing various control programs and a RAM 305 is provided for storing processed results for the operations of the control unit 139.

More specifically, the control unit 139 includes a terrain height control unit for displaying a three-dimensional image of a selected terrain with a desired height as shown in FIGS. 2B, 3B and 4B. The control unit 139 also includes a viewing angle control unit for displaying a three-dimensional image of a selected terrain with a desired viewing angle as shown in FIGS. 2A and 4A. As will be described later, the control unit 139 further includes an LOD (level of detail) selection unit for displaying a three-dimensional image of a selected terrain or road map with a desired level of details in a manner described later with reference to FIGS. 4B and 10A-10B. Moreover, the control unit 139 includes a border compensation unit for compensating discontinuity at a border of two images with different heights, viewing angles, LOD, etc. Examples of such border compensation functions are shown in FIGS. 11A-11B, 12, 13 and 14A-14B as will be described later. It should be noted that such functional units may not necessarily be formed by the control unit 139 but can be formed separately by respective microprocessors and memories.

Figure 6:
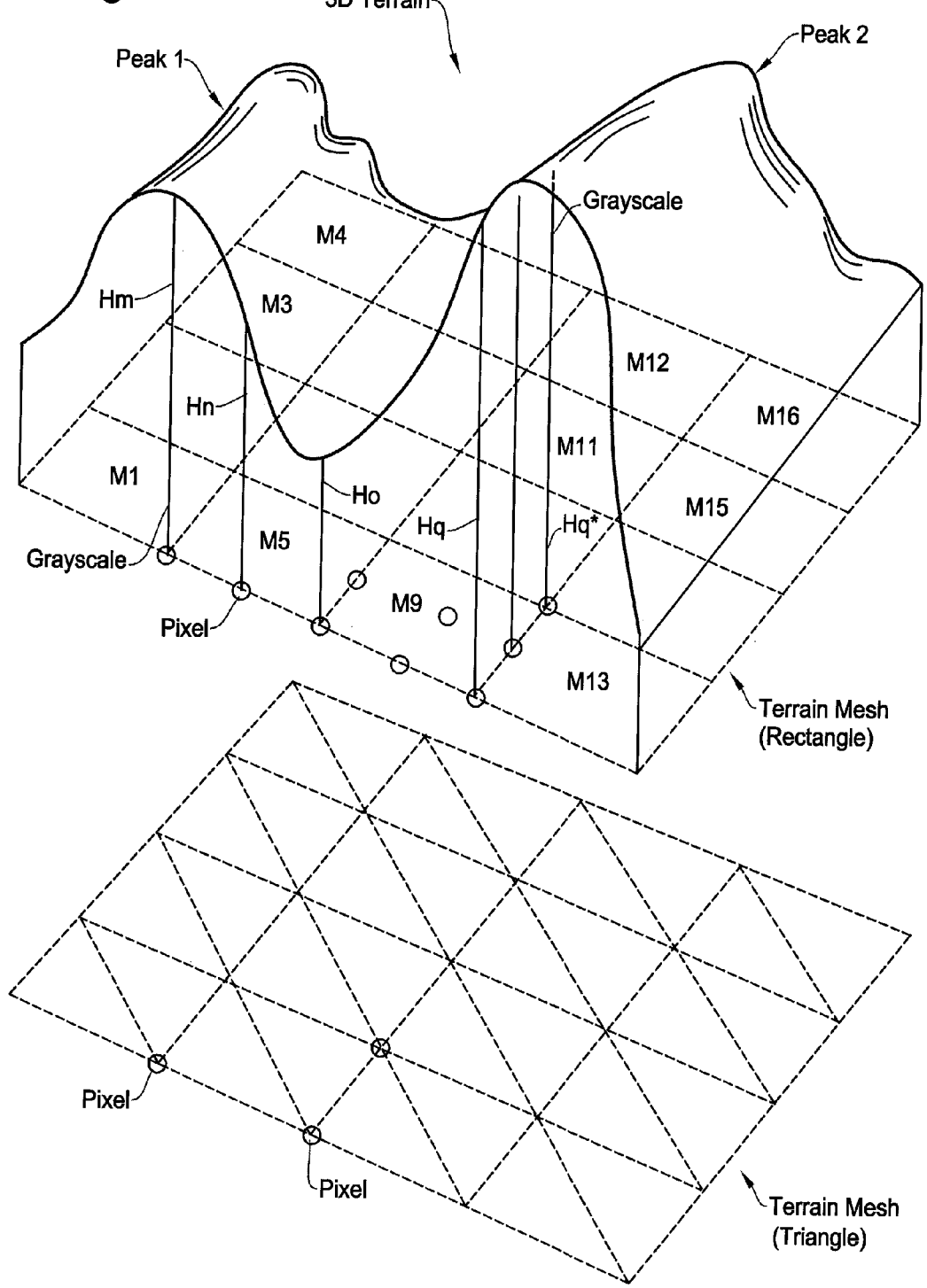
FIG. 6 is a schematic diagram showing an example of terrain data in a terrain data storage of the display apparatus and an image of three-dimensional terrain associated with the particular terrain data where the terrain data is configured by a plurality of polygonal meshes and grayscale information for each of data points in the polygonal mesh.

FIG. 6 shows an example of terrain data in the terrain data storage 130 and an image of three-dimensional terrain associated with the particular terrain data. As noted above, typically, the terrain data in the terrain data storage 130 is based on the topographic map data created by USGS (United States Geographical Survey). The three-dimensional image of terrain expressed by the topographic map data is parsed to an appropriate density (pixels or data points per mesh) for a purpose of display by the navigation system.

The parsed data is converted to a format compatible with a database such as the terrain data storage 130 (FIG. 5) of the navigation system. Typically, the converted terrain data is further converted to grayscale data with respect to each location (pixel, data point) of the terrain so that the three-dimensional image will be expressed by shadings or intensity. As is known in the art, the grayscale image carries only intensity information where the degree of intensity expresses elevation (height) of each location of the terrain.

In the example of FIG. 6, a portion of three-dimensional terrain having a peak 1 and a peak 2 is expressed by grayscale information defined in terrain meshes M1-M16. It should be noted that the image of the three-dimensional terrain in FIG. 6 shows a cut-out of a larger terrain image where the cut-out corresponds to the terrain meshes (mesh boxes) M1-M16, which is provided here for the illustration purpose only. In each of the terrain meshes M1-M16, a plurality of pixels (data points, X-Y locations) are established where each pixel is assigned with grayscale information (height data) of the three-dimensional terrain.

In FIG. 6, each terrain mesh (mesh box) is shaped in rectangle in the upper example, however, the terrain mesh can be other polygonal shape as well, for example, each terrain mesh can be a triangle shape as shown in the lower part of FIG. 6. Such terrain data in the form of terrain meshes (polygon meshes) and grayscales are stored in the terrain data storage (terrain database) 130 in FIG. 5. As briefly noted above, the map data in the map data storage (map database) 131 is modified to be compatible with the terrain data. For example, the map data is so configured that a vertex of each road matches the corresponding height of the terrain at the most proximate location with one another. Thus, the heights of the terrain (grayscale image) and the road edges match with one another on the three-dimensional images on the monitor screen, thereby avoiding the problem of "dig into" or "fly above" noted above.

Such polygon meshes or polygon grids noted above are well known in the art of three-dimensional computer graphics and graphic software packages, and hardware devices for such applications are available in the market. Further, conversion of the topographic map into the grayscale image or grayscale information is well known in the art of map display technology as well as color and intensity graphics technology. Thus, in the present application, no further descriptions will be made regarding these technologies.

Figure 7A:
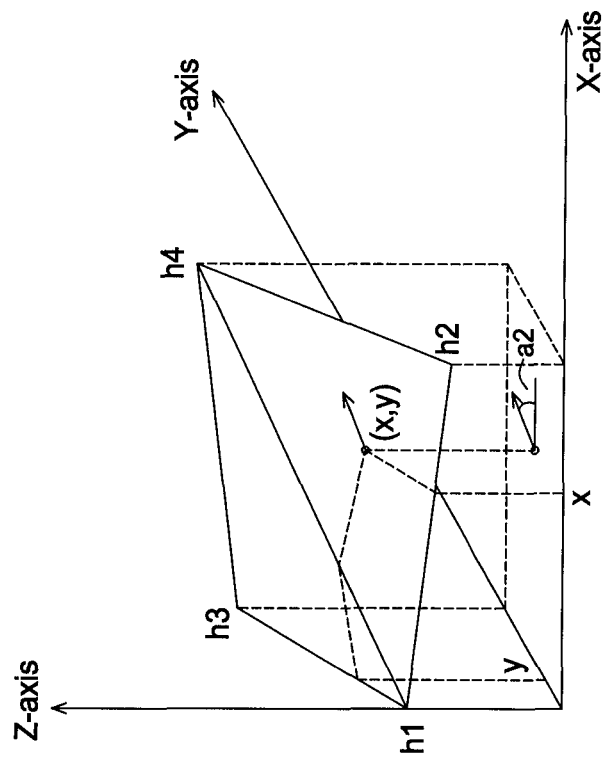
FIGS. 7A and 7B are schematic diagrams showing a basic concept of the embodiment for changing a viewing point such as a viewing angle or a viewing height of a three-dimensional object where
Figure 7B:
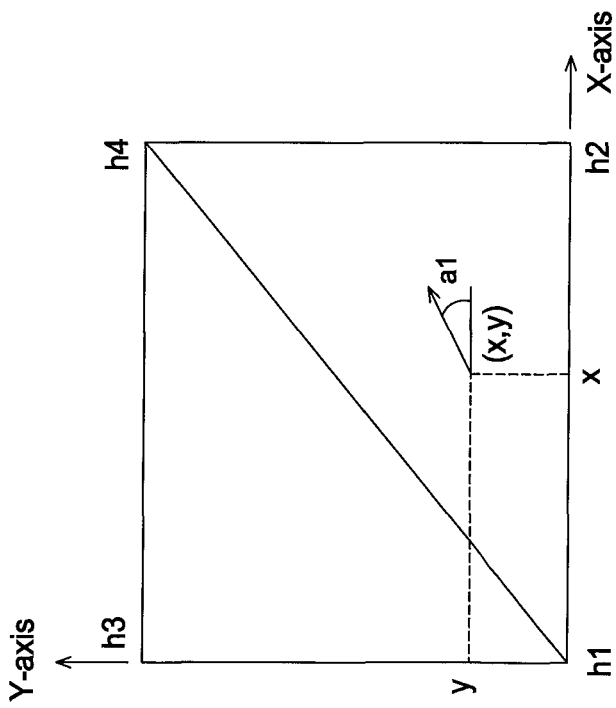

FIGS. 7A and 7B are schematic diagrams showing a basic concept of the embodiment for changing a viewing angle or a viewing height with respect to a viewing point of a three-dimensional object. FIG. 7A shows a two-dimensional image with respect to the viewing point when changing the viewing angle such that the image is viewed from an upright position of the three-dimensional object. FIG. 7B shows a three-dimensional image thereof when changing the viewing point of the object with respect to a parameter of viewing angle and/or height except for the upright position of FIG. 7A.

In the two-dimensional state of FIG. 7A, the viewing point matches the pixel on the terrain mesh which is defined by a combination of x-coordinate and y-coordinate (x,y) where "a1" indicates and an angle of direction of a user, typically, a vehicle heading direction. In the three-dimensional state of FIG. 7B, the viewing point on the terrain is defined by a combination of x-coordinate and y-coordinate (x,y) on the terrain mesh as well as z-coordinate (z: height) where "a2" indicates an angle of direction of a user, typically, a vehicle heading direction. In FIGS. 7A and 7B, "h1-h4" indicate corner points defined on a horizontal plane (X-Y).

In the embodiment, the height of terrain is expressed by formulas: Y=y position in mesh block, X=x position in mesh block, value=height of terrain at X,Y

```
//Get 4 corners of a square that contain X,Y
    height1 = m_heightmap[Y + X *
    NUM_POINTS_FOR_TERRAIN];
    height2 = m_heightmap[Y + (X+1) *
    NUM_POINTS_FOR_TERRAIN];
    height3 = m_heightmap[(Y+1) + X *
    NUM_POINTS_FOR_TERRAIN];
    height4 = m_heightmap[(Y+1) + (X+1) *
    NUM_POINTS_FOR_TERRAIN];
    //Determine which triangle of the Square found above the X,Y point
is within. Then calculate the height of that triangle at the X,Y point
    if(X + Y > 1)
    value = height4 + ((height3 – height4) * (1–X) +
    (height2 – height4) * (1–Y));
    else
    value = height1 + ((height3 – height1) * (Y) +
    (height2 – height1) * (X));
    return value;
```

In the embodiment, the angle (slope) of terrain is expressed by formulas: Y=y position in mesh block, X=x position in mesh block, degrees=direction of car, value=slope of terrain at X,Y

```
//Get 4 corners of a square that contain X,Y
    height1 = (GLfloat)m_heightmap[Y + X *
    NUM_POINTS_FOR_TERRAIN];
    height2 = (GLfloat)m_heightmap[Y + (X+1) *
    NUM_POINTS_FOR_TERRAIN];
    height3 = (GLfloat)m_heightmap[(Y+1) + X *
    NUM_POINTS_FOR_TERRAIN];
    height4 = (GLfloat)m_heightmap[(Y+1) + (X+1) *
    NUM_POINTS_FOR_TERRAIN];
    GLfloat z1, z2;
    if(xPointF + Y > 1)
    {
    z1 = (height2 – height4) /
(GLfloat)MapUnitsConversion::SCENE_CELL_SIZE *
(GLfloat)NUM_POINTS_FOR_TERRAIN;
    z2 = (height3 – height4) /
(GLfloat)MapUnitsConversion::SCENE_CELL_SIZE *
(GLfloat)NUM_POINTS_FOR_TERRAIN;
    value = (atan(z1) * cos((degrees) * 3.14159 / 180.) –
atan(z2) * sin((degrees) * 3.14159 / 180.)) * 180. / 3.14159;
    }
    else
    {
    z1 = (height2 – height1) /
(GLfloat)MapUnitsConversion::SCENE_CELL_SIZE *
(GLfloat)NUM_POINTS_FOR_TERRAIN;
    z2 = (height3 – height1) /
(GLfloat)MapUnitsConversion::SCENE_CELL_SIZE *
(GLfloat)NUM_POINTS_FOR_TERRAIN;
    value = (atan(z1) * sin((degrees) * 3.14159 / 180.) –
atan(z2) * cos((degrees) * 3.14159 / 180.)) * 180. / 3.14159;
    }
```

Figure 8A:
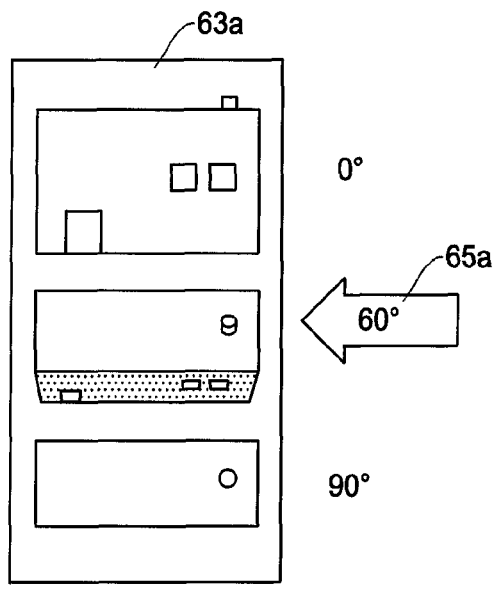
FIGS. 8A-8C show examples of tools for changing parameters, i.e., indicators and scroll arrows for freely changing the viewing angle, height, and level of details (LOD) of the three-dimensional images on the monitor screen.
Figure 8B:
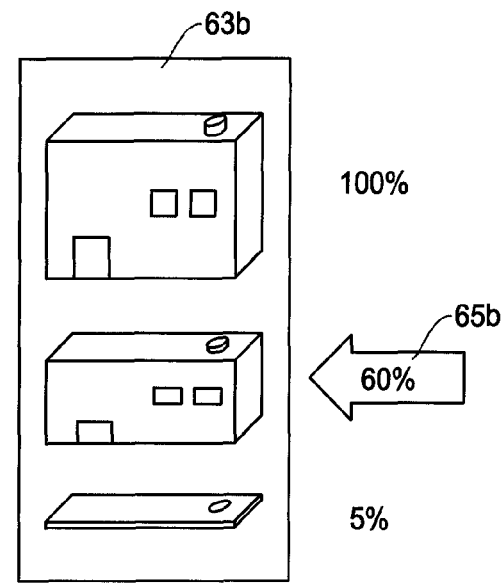
Figure 8C:
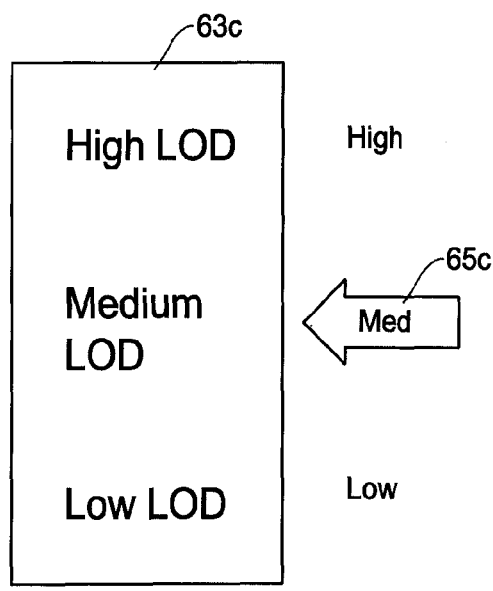

FIGS. 8A-8C show examples of the indicators and scroll arrows for freely changing the viewing angle, height, and level of details (LOD) of the three-dimensional images on the monitor screen. FIG. 8A shows an example of angle indicator 63a and scroll arrow 65a which is basically an enlarged view of that shown in FIG. 2A. FIG. 8B shows an example of height indicator 63b and scroll arrow 65b which is basically an enlarged view of that shown in FIGS. 2B and 3A. FIG. 8C shows an example of LOD indicator 63c and scroll arrow 65c to select a desired level of details of the three-dimensional image such as terrain, roads and polygon objects on the monitor screen.

In the example of FIG. 8A, the navigation system displays the angle indicator 63a and the scroll arrow 65a (tool) on the three-dimensional display to allow the user to continuously change the viewing angle of the selected object, such as the building 27 in FIG. 2A. The angle indicator 63a includes icons showing different levels of viewing angles. Typically, the user touches the scroll arrow 65*a* on the surface of the monitor screen and moves his/her finger up/down along the angle indicator 63*a* to change the viewing angle between, for example, 0-90 degrees. In this example, the viewing angle is indicated by an angle with respect to a horizontal surface (X-Y plane or ground) on which the object is standing.

In the example of FIG. 8B, the navigation system displays the height indicator 63*b* and the scroll arrow 65*b* (tool) on the three-dimensional display to allow the user to continuously change the height of the selected object, such as the building 27 in FIG. 2B or the mountain 37 in FIG. 3A. The height indicator 63*b* includes icons showing different levels of heights. Typically, the user touches the scroll arrow 65*b* on the surface of the monitor screen and moves his/her finger up/down along the height indicator 63*b* to change the height of the three-dimensional object between minimum to 100 percent. In this example, the minimum height of the selected three-dimensional object is 5%, such an amount of minimum height can be freely determined depending on the convenience in the actual use.

In the example of FIG. 8C, the navigation system displays the LOD (level of details) indicator 63*c* and the scroll arrow 65*c* (tool) on the three-dimensional display to allow the user to change the LOD of the selected object, such as a map image within the selected area. Typically, the user touches the scroll arrow 65*c* on the surface of the monitor screen and moves his/her finger up/down along the LOD indicator 63*c* to change the level of details of the three-dimensional object between low, medium and high. Although this example shows the situation where the user selects the LOD, the navigation system may dynamically select the LOD of the map image depending on, for example, the viewing angle and the height of the three-dimensional object.

Figure 9A:
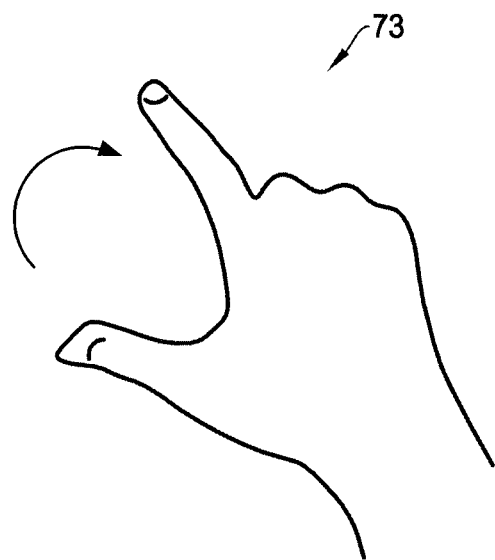
FIGS. 9A and 9B show examples of freely changing the viewing angle and/or height of the three-dimensional image of the object only by finger actions of the user on the touch sensor of the display screen where
Figure 9B:
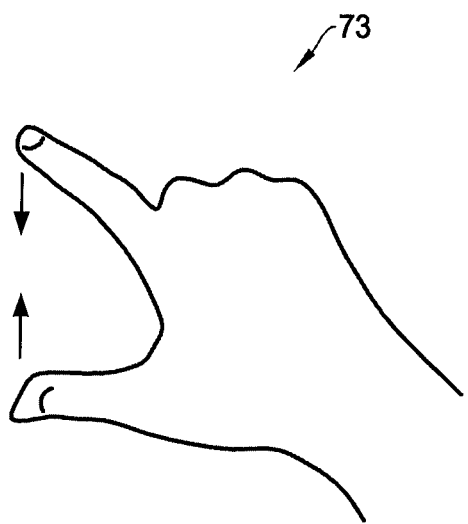

FIGS. 9A and 9B show examples of freely changing the viewing angle and/or height of the three-dimensional images on the monitor screen only by finger actions of the user. FIG. 9A shows an example of finger action to change the viewing angle of the three-dimensional object where the user touches surface of the screen and moves the two fingers in a manner to rotate them. FIG. 9B shows an example of finger action, similar to the example shown in FIG. 3B, to change the height of the three-dimensional object where the user touches surface of the screen and moves the two fingers in a manner to change the distance between the fingers in an up/down direction.

Figure 19:
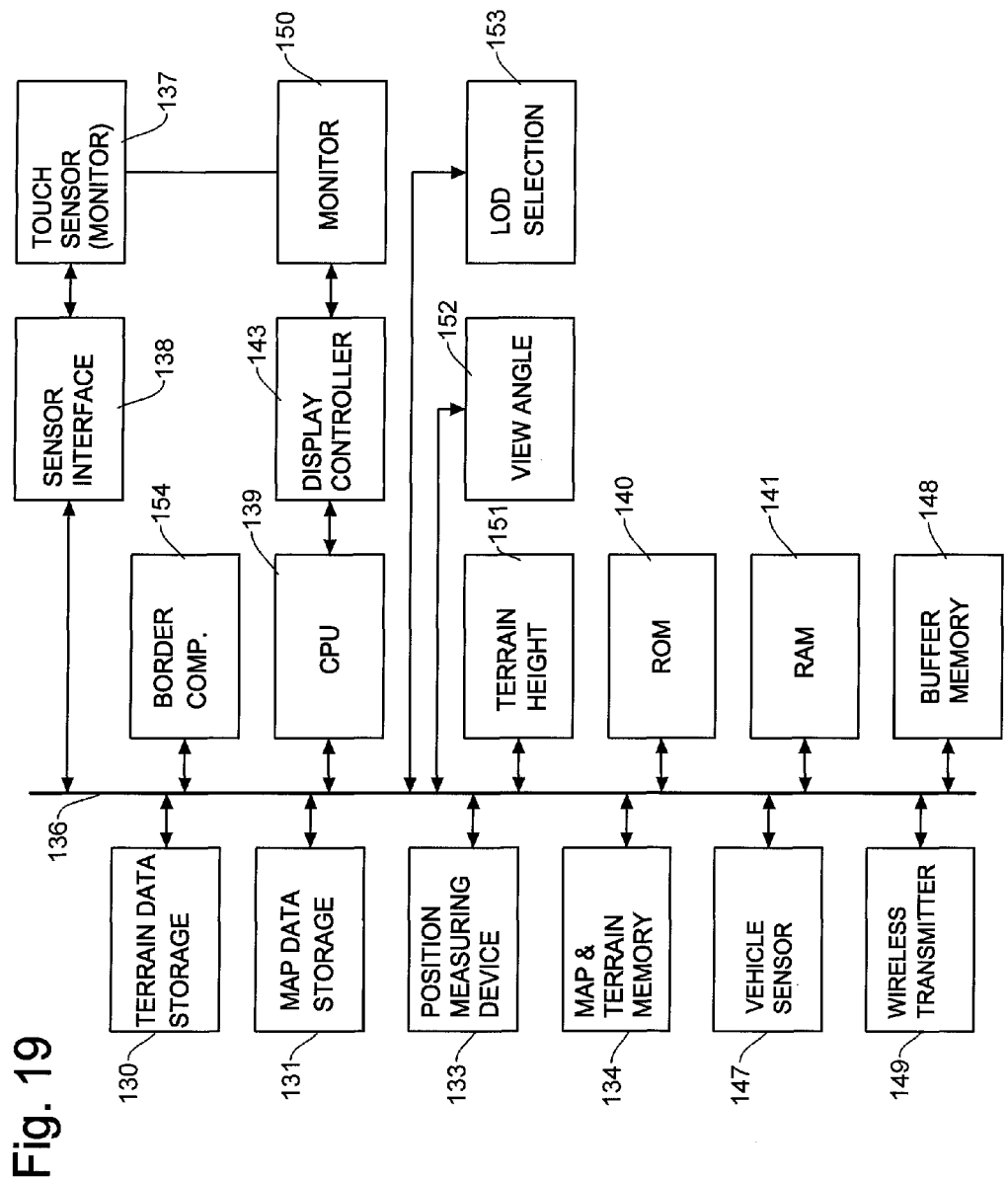
FIG. 19 is a functional block diagram showing an example of structure of a navigation system incorporated in a vehicle to implement the display method and apparatus for three-dimensional terrain and route guidance.

In FIGS. 9A and 9B, the user approaches his/her hand 73 to the monitor screen, touches the surface of the monitor by two fingers and moves the fingers, which is detected by the touch sensor 137 on the monitor screen 150 and is interpreted by the sensor interface 138 (FIGS. 5 and 19). In FIG. 9A, the user rotates the fingers on the touch screen to change the angle, and in FIG. 9B, the user moves the fingers up/down to change the height. It is also feasible that a combination of finger actions of FIG. 9A for changing the viewing angle and FIG. 9B for changing the height at the same time.

Figure 10A:
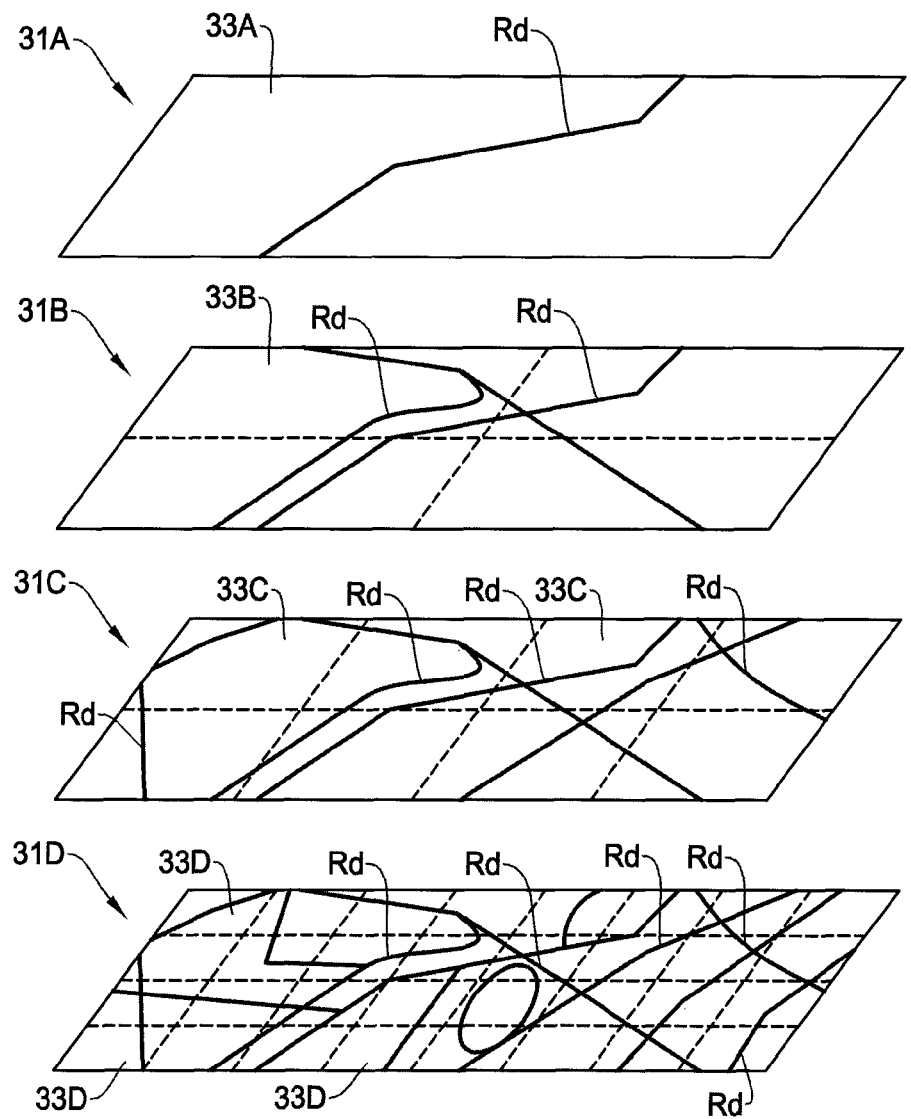

FIGS. 10A and 10B are schematic diagrams showing examples of multiple data layer (multi-layered structure) of the map data used in the navigation system where each data layer is configured by data divided in the form of meshes, roads of various classes, road links, nodes, etc. FIG. 10A shows an example of multiple data layers with different levels of details (LOD). FIG. 10B shows an example in which a part of the map data of higher LOD is combined with the map data of lower LOD. As is known in the art, in order to promote high speed and high flexible processing, the map data used for a navigation system is typically structured in a form of multiple layers of different levels of details. Each layer of map data is further divided by a plurality of map meshes which is similar to the terrain meshes shown in FIG. 6 used in the terrain database.

FIG. 10A is a schematic diagram showing an example of such a multiple layer data format of the map data used in the navigation system. As shown, the format of the map data in FIG. 10A is configured by a plurality of data layers 31A-31D each representing a part of the map data to be stored in the map data storage 131 (FIGS. 5 and 19) of the navigation system. As noted above, the data in each of the map data layers 31A-31D is further divided into a plurality of map meshes or map cells 33A-33D.

Namely, the map data is hierarchically layered corresponding to the level of details of the map information as well as divided into the map meshes corresponding to the predetermined size or amount of the map data that is suitable to a particular application and processing power of the navigation system. In the example of FIG. 10A, the higher the layer of the hierarchy, the lower the level of details of the map information and the larger the mesh size. Typically, the mesh size is equivalent to the covering area, such as a displayed map area, that the navigation system is handling in a current application.

Typically, the higher layer represents only high class roads, for example, interstate highway, freeway, etc. while the lower layer represents low class roads, i.e., residential roads, etc., POI icons, building foot prints, etc., in addition to that represented by the higher layers. One of the reasons for using the layered structure is to accommodate several different map scales for enlarging (high LOD) or shrinking (low LOD) the map image on the display screen on the navigation system. Since the lower layer includes more detailed map information, the size of the meshes 33A-33D (covering area) is smaller than that of the higher layer to maintain the amount of map data to be processed within a predetermined range.

Since the map data is treated as a unit of mesh 33 as shown in FIG. 10A, the navigation system does not have to process an excessively large amount of map data at a time. Namely, the navigation system processes the map data corresponding to each unit of the mesh on the corresponding layer. The layer 31A shown in FIG. 10A is comprised of one mesh 33A while the layer 31B is comprised of four meshes 33B, and the layer 31C is comprised of eight meshes 33C while the layer 31D is comprised of sixteen meshes 33D.

FIG. 10B shows a situation in which the map data of different levels of details is combined to be displayed on the navigation screen. The data layer 31B and the data layer 31D each being identical to those shown in FIG. 10A are shown in the upper and middle positions and the combined data is shown in the lower position. The map mesh 33B in the data layer 31B shows the map data of a lower LOD (level of details) while the map mesh 33D in the data layer 31B shows the map data of a higher LOD.

In the embodiment, in the data layer 31M shown at the bottom of FIG. 10B, at about the center, one of the map meshes 33D in the high LOD is combined with the map meshes 33B in the low LOD. The data layer 31M corresponds to the map image to be displayed, i.e., a part of the map area on the screen is changed its LOD with respect to the detailedness of the map information. To achieve this, for example, in the configuration of FIG. 5, the LOD selection unit in the control unit 139 creates such combined data layer 31M and store the data layer in RAM 141 or other memory to display the combined map image on the monitor 150.

As noted above, FIG. 4B shows an example of such a combined map image in which the image in the area ARh is illustrated in the higher LOD while the areas surrounding the area ARh are illustrated in the lower LOD. To display such a high LOD image in the lower LOD image, in one embodiment, the LOD selection unit may automatically select such an area and a degree of LOD based on predetermined conditions, for example, detecting an area (1) that is associated with the guidance route to the destination and (2) that has become visible or more meaningful by changing the angle or height of the three-dimensional object. In another embodiment, the user may select an area and a degree of LOD to display the combined image by following the menus or instructions on the monitor screen of the navigation system.

Figure 11A:
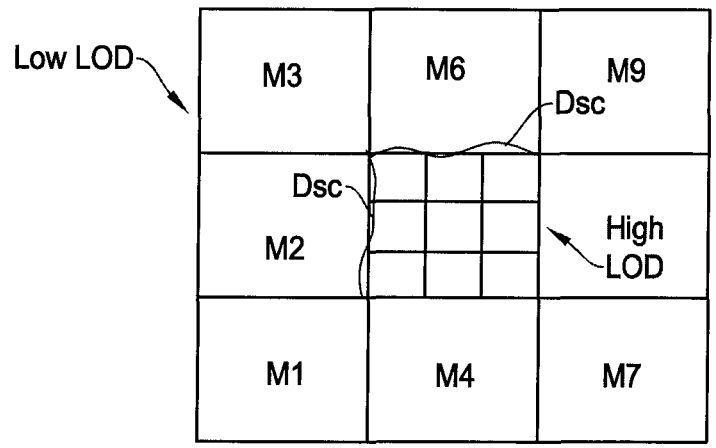
FIGS. 11A and 11B are schematic diagrams showing a situation of map data or terrain data which arises when combining the two data layers of different LOD where
Figure 11B:
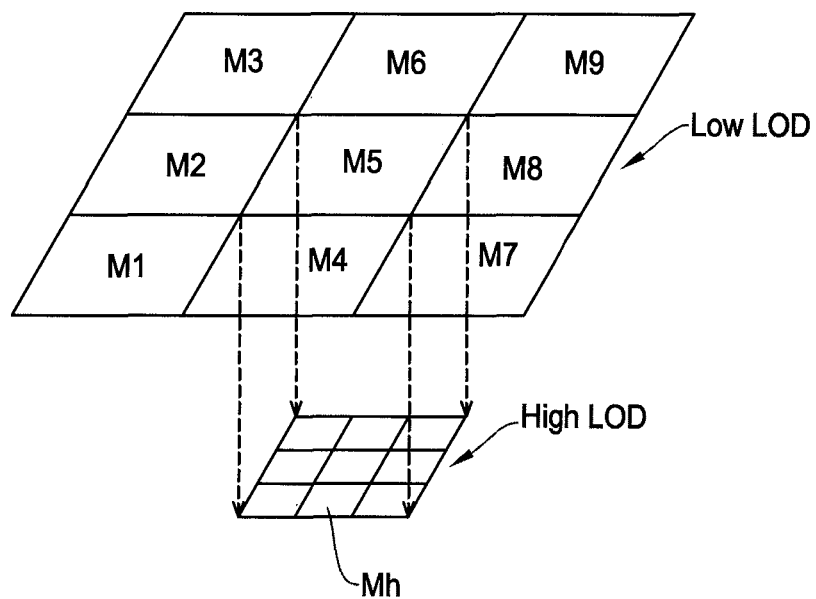

FIGS. 11A and 11B are schematic diagrams showing a situation of map data or terrain data which arises when combining the two data layers of different LOD in a manner similar to the data layer 31M in FIG. 10B. In this example, in FIG. 11A, the data layer of low LOD has map meshes M1-M9 where the map mesh M5 is to be replaced with the data layer of high LOD. In FIG. 11B, the data layer of high LOD has a plurality of map meshes Mh each having an area size smaller than that of each of the map meshes M1-M9. However, each of the map meshes Mh in high LOD has more detailed map information per size than that of each of the map meshes M1-M9 in low LOD.

In combining the map images of different LOD, as shown in FIG. 11A, a discontinuous portion Dsc may arise at the border of images between the higher and lower detail levels. As noted above with reference to FIG. 5, during the operation of combining the images of different LOD or changing the height of the object, etc., the navigation system compensates the discontinuity that may arise at a border portion between the selected three-dimensional object and other objects, or between the selected part of the map image and the other map images. In the example of FIG. 5, the control unit 139 includes the border compensation unit for compensating such discontinuity at the border of two images with different heights, different LODs, etc.

FIG. 12 is a schematic diagram showing an example of method for correcting the discontinuity arises in the situation of FIGS. 11A and 11B when a part of the map image (map meshes) is replaced with the map image (map meshes) of different level of details. In this example, the map mesh M5 in the data layer of low LOD is replaced with the map meshes Mh1-Mh9 in the data layer of high LOD. Note data points of the data layer in the low LOD at an outer circumference are not shown for simplicity of illustration.

The low LOD data layer at the top of FIG. 12 is configured by the original map data with map meshes M1-M9, i.e., the map meshes before partially being replaced with the high LOD map data. In replacing the map data in the map mesh M5 with the map meshes Mh1-Mh9, as shown at the middle of FIG. 12, the data points (pixels) at the border of the map mesh M5 in the low LOD are changed to data points (pixels) identical to that of perimeter of the map mashes Mh1-Mh9 in the high LOD. Since the data points of the low LOD and the high LOD match with one another at the border in numbers and locations, even when the map images of different LOD are combined, it is possible to avoid the potential discontinuity of the image on the monitor screen.

To do this, the border compensation unit, which may be established in the control unit 139 of FIG. 5 (or separately in FIG. 19), checks the data points at the border of the map mash M5. The border compensation unit further checks the data points at the outer periphery of the map meshes Mh1-Mh9. Since the map mesh M5 and the map meshes Mh1-Mh9 are in the data layer of different LOD, the location and density of the data points are different with one another. Thus, in this embodiment, the border compensation unit changes the data points of the lower LOD (mesh M5) to the data points identical to that of the higher LOD (meshes Mh1-Mh9) in location and number, thereby enabling to combine the map images of different LOD without discontinuity on the monitor screen.

Figure 13:
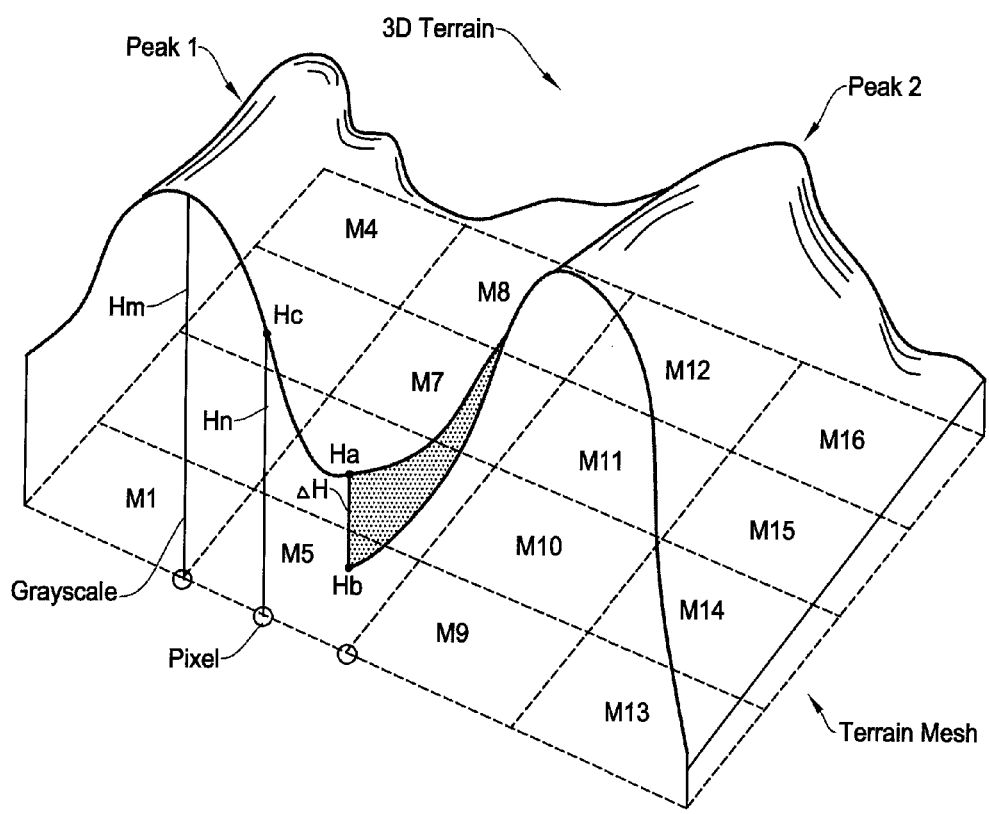
FIG. 13 is a schematic diagram showing a three-dimensional terrain and associated terrain meshes in which a part of terrain image is changed its height thereby causing discontinuity in the terrain image.

FIG. 13 is a schematic diagram showing a three-dimensional terrain and associated terrain meshes in which a part of terrain image is changed its height thereby causing discontinuity in the terrain image. The three-dimensional terrain of FIG. 13 is basically the same as that of FIG. 6, however, the height of the peak 2 is reduced in FIG. 13 from that of FIG. 6. Namely, in the situation of FIG. 13, the values of grayscales (elevation) in the terrain meshes M9-M16 are reduced so that the height of the peak 2 is decreased while the grayscales in the terrain meshes M1-M8 involving the peak 1 are unchanged so that the height of the peak 1 remains the same.

As a consequence, a hidden part of three-dimensional image (not shown) that was behind the peak 2 may now become visible on the monitor screen. However, since the values of grayscale for the terrain meshes M1-M8 remain the same, a discontinuous portion will arise at the border between the terrain meshes M5-M8 and M9-M12. In FIG. 13, such a discontinuous portion is illustrated by the dot hatches where ΔH indicates a difference in height between a point Ha (original height) and a point Hb (decreased height). The point Ha is represented by the grayscales of the terrain meshes M5-M8 (unchanged) and the point Hb is represented by the grayscales of the terrain meshes M9-M12 (changed).

Figure 14A:
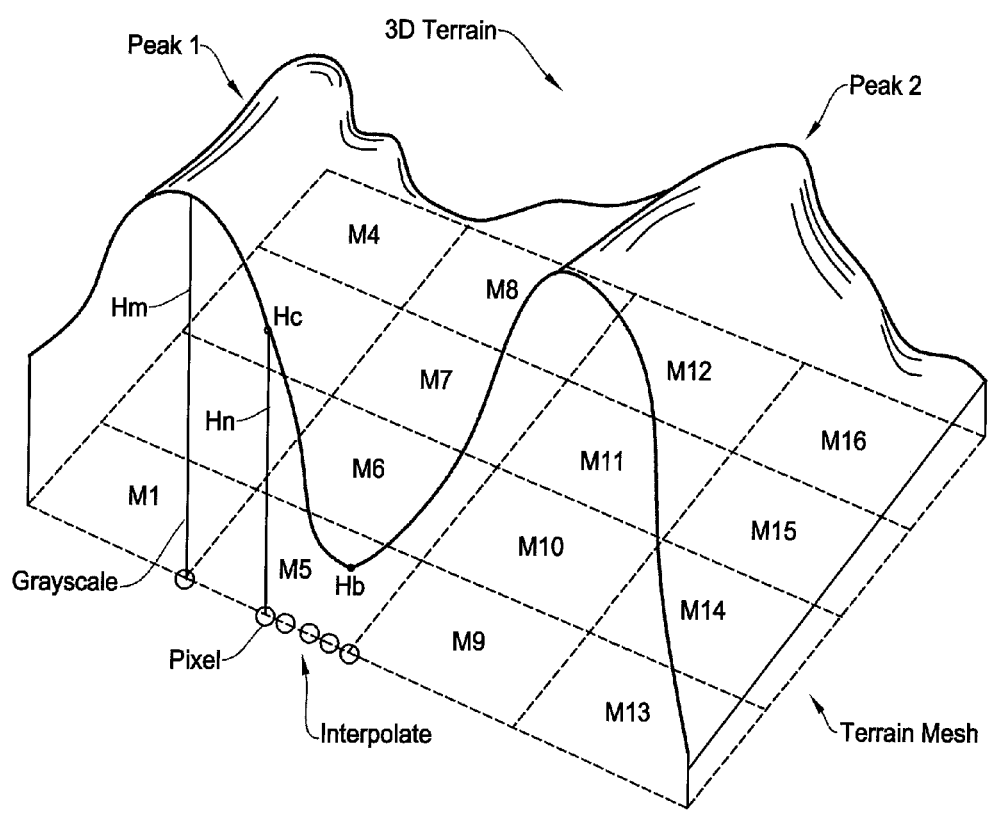
FIGS. 14A and 14B show examples of method for compensating the discontinuity arises in the case of FIG. 13 where the grayscales of the terrain meshes M5-M8 are changed to match with that of the terrain meshes M9-M12 in FIG. 14A, and the grayscales of the terrain meshes M9-M12 are changed to match with that of the terrain meshes M5-M8 in FIG. 14B, while incorporating an interpolation process.
Figure 14B:
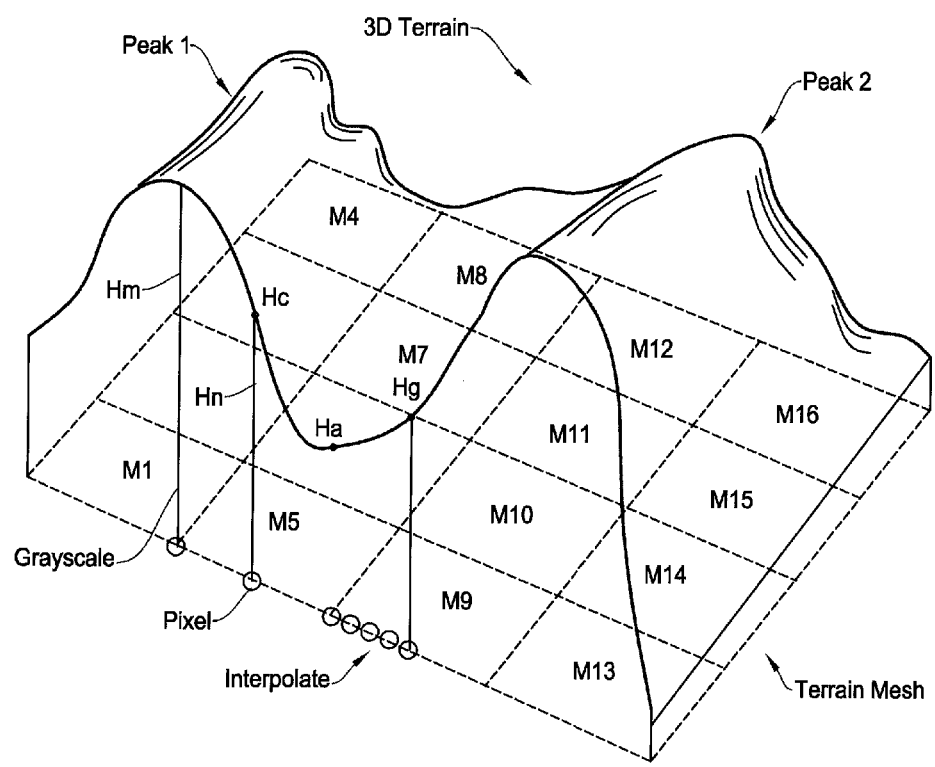

FIGS. 14A and 14B show examples of method of compensating the border discontinuity arisen in the case of FIG. 13 noted above, since such discontinuity of the three-dimensional image on the monitor may cause confusion and discomfort to a user. In FIG. 14A, the grayscales of the terrain meshes M5-M8 are changed to match with that of the terrain meshes M9-M12 while incorporating an interpolation process for an intermediate region. In FIG. 14B, the grayscales of the terrain meshes M9-M12 are changed to match with that of the terrain meshes M5-M8 while incorporating the interpolation process for another intermediate region.

In the example of FIG. 14A, the grayscales of the terrain meshes M5-M8 are adjusted to be identical or similar to that of the terrain meshes M9-M12. For example, with respect to the data points (pixels) at the circumference of the terrain mesh M5, the height point Ha in FIG. 13 is lowered to be the same as the height point Hb. Then, for the intermediate region between the height point Ha (now Hb) and an arbitrally selected height point, such as Hc, data points (pixels) are added and the grayscales of the added data points are interpolated to establish intermediate values. This compensation process will be conducted for all of the data points at the border area between the terrain meshes M5-M8 and M9-M12.

In the example of FIG. 14B, the grayscales of the terrain meshes M9-M12 are adjusted to be identical or similar to that of the terrain meshes M5-M8. For example, with respect to the data points (pixels) at the circumference of the terrain mesh M9, the height point Hb in FIG. 13 is increased to be the same as the height point Ha. Then, for the intermediate region between the height point Hb (now Ha) and an arbitrally selected height point, such as Hg, data points (pixels) are added and the grayscales of the added data points are interpolated to establish intermediate values. This compensation process will be conducted for all of the data points at the border area between the terrain meshes M5-M8 and M9-M12.

As is known in the art, the interpolation is a process of estimating intermediate values between two data points of known values by constructing new data points within the region of the two known data points. Typically, such a process is conducted by a linear interpolation by estimating the intermediate values in a manner of straight line or a spline interpolation by estimating the intermediate values in a manner of spline or curve. Since the concept and method of interpolation is known in the art, no further explanations will be made here.

Figure 15:
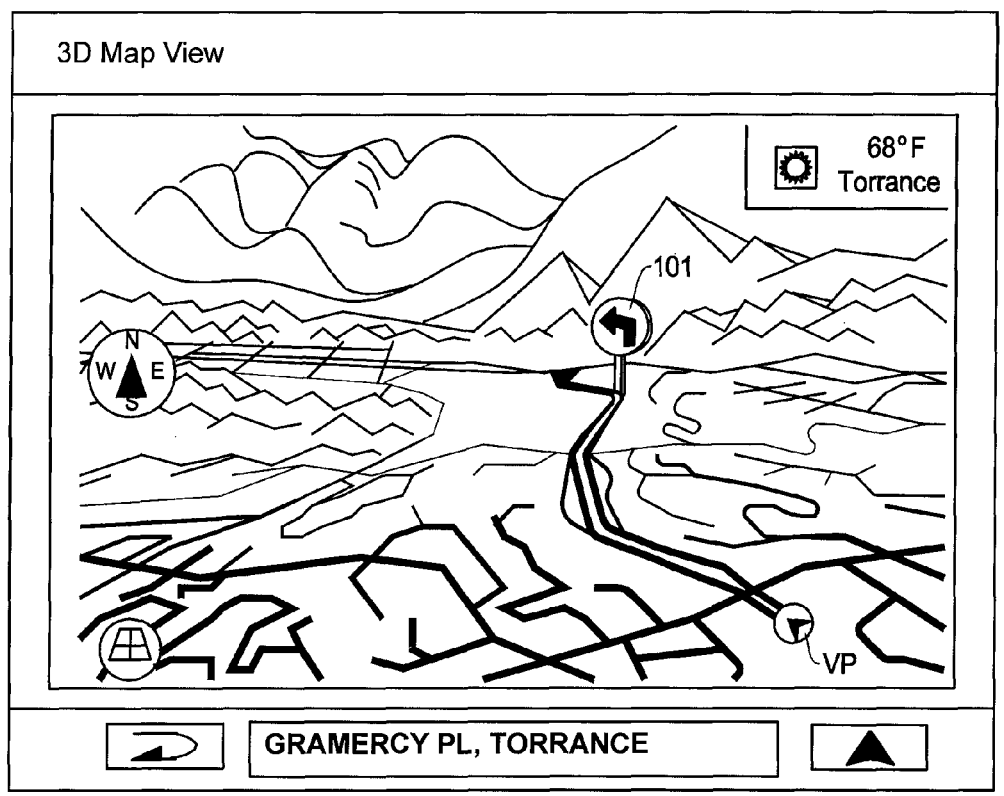
FIG. 15 shows an example of monitor screen to display a three-dimensional real-time rendering environment including three-dimensional guidance information which allows the user to understand complex maneuvers without using two-dimensional overlays.

FIG. 15 shows an example of monitor screen to display a three-dimensional real-time rendering environment including three-dimensional guidance information which allows the user to understand complex maneuvers without using two-dimensional overlays. In FIG. 15, the navigation system provides a three-dimensional real-time rendering environment including three-dimensional guidance information 101 which allows the user at the vehicle position VP to understand complex maneuvers without using two-dimensional overlays. In the three-dimensional rendering environment, a plurality of three-dimensional signs and turn markers can be placed in the three-dimensional space to indicate proper routes, as they do in the real world.

Figure 16:
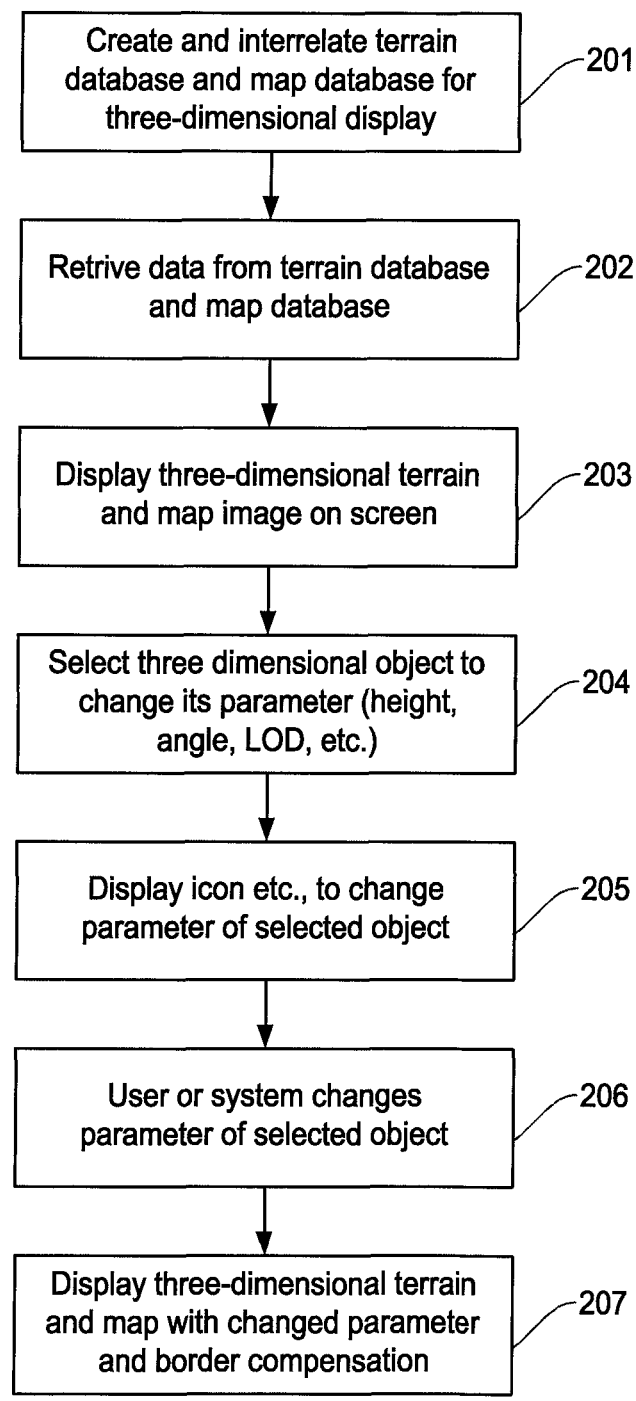
FIG. 16 is a flowchart showing basic operational steps of the display method of three-dimensional terrain and route guidance for creating a terrain database and a map database, selecting three-dimensional object on a screen, changing parameters of selected object, displaying resultant terrain and map with border compensation.

FIG. 16 is a flowchart showing basic operational steps of the display method of three-dimensional terrain and route guidance for creating a terrain database and a map database, selecting three-dimensional object on a screen, changing parameters of selected object, displaying resultant terrain and map with border compensation, etc. A more detailed process of step 201 in FIG. 16 for creating the terrain database and the map database is described with reference to a flowchart of FIG. 17. Further, a more detailed process of steps 206 and 207 in FIG. 16 for applying the requested changes and displaying the resultant terrain and map image with the border compensation operation is described with reference to a flowchart of FIG. 18.

In the example of FIG. 16, in the step 201, the process starts by creating the databases for terrain data and map data and interrelates between the terrain data and the map data for the three-dimensional display. As noted above with reference to FIGS. 5 and 6, the terrain data in the terrain data storage (terrain database) 130 is typically created based on the topographic map data provided by USGS (United States Geographical Survey). The terrain data and the map data are interrelated with one another by, for example, modifying the map data to be compatible with the terrain data in terms of height as noted above.

In the step 202, when the user sets the navigation system to a three-dimensional display mode, the process retrieves the appropriate terrain data from the terrain data storage 130 and the map data from the map data storage 131. Typically, an appropriate amount of terrain data and map data necessary for the current application is retrieved and stored in the map and terrain memory 134 for processing by the control unit 139 (FIG. 5). Then, in the step 203, the navigation system displays the three-dimensional images of the terrain and routes on the monitor screen 150 as shown in FIGS. 1A and 1B.

As noted above, in the three-dimensional display mode, the navigation system is configured to allow the user to change parameters of a selected three-dimensional object on the monitor screen. Thus, in the step 204, the user selects a three-dimensional object on the screen by, for example, a finger action writing a circle on the monitor surface (touch screen) as shown in FIGS. 2A-2B and 3A. Other action, such as tapping on the desired object may also be feasible for this purpose. The parameters include a viewing angle of the selected object, a height of the selected object, and a level of details (LOD) of the selected object.

Then, in the step 205, the navigation system displays a tool for changing the parameters, such as a pair of an angle indicator 63a and a scroll arrow 65a shown in FIG. 2A. Other example of such a tool is a pair of height indicator 63b and a scroll arrow 65b as shown in FIGS. 2B and 3A, or a pair of LOD indicator 63c and a scroll arrow 65c as shown in FIG. 8C. Alternatively, without such a tool displayed on the screen, the navigation system may be configured to allow the user to change the desired parameters by only his/her finger actions on the touch sensor as shown in FIGS. 3B and 9A-9B.

Thus, in the step 206, the user changes the parameters of the selected object with a desired degree by up/down movement of the scroll arrow noted above, or the finger actions. This step with respect to the type of parameters and degrees of changes will be described in more detail with reference to the flowchart of FIG. 18. Depending on the actual situation, the navigation system may automatically changes the parameters of the specific object on the three-dimensional display based on predetermined conditions.

For example, the navigation system may change the viewing angle of the object in response to an angle of vehicle heading detected by a vehicle sensor. Further, the navigation system may automatically changes the parameter, for example, a degree of level of details (LOD) for an area that is associated with the guidance route to the destination and/or an area that has become visible or more meaningful by changing the angle or height of the three-dimensional object. Finally, in the step 207, the navigation system displays the resultant terrain and map images. As noted above, the navigation system conducts the border compensation operation to correct the discontinuity at the border of images between different degrees of parameters.

Figure 17:
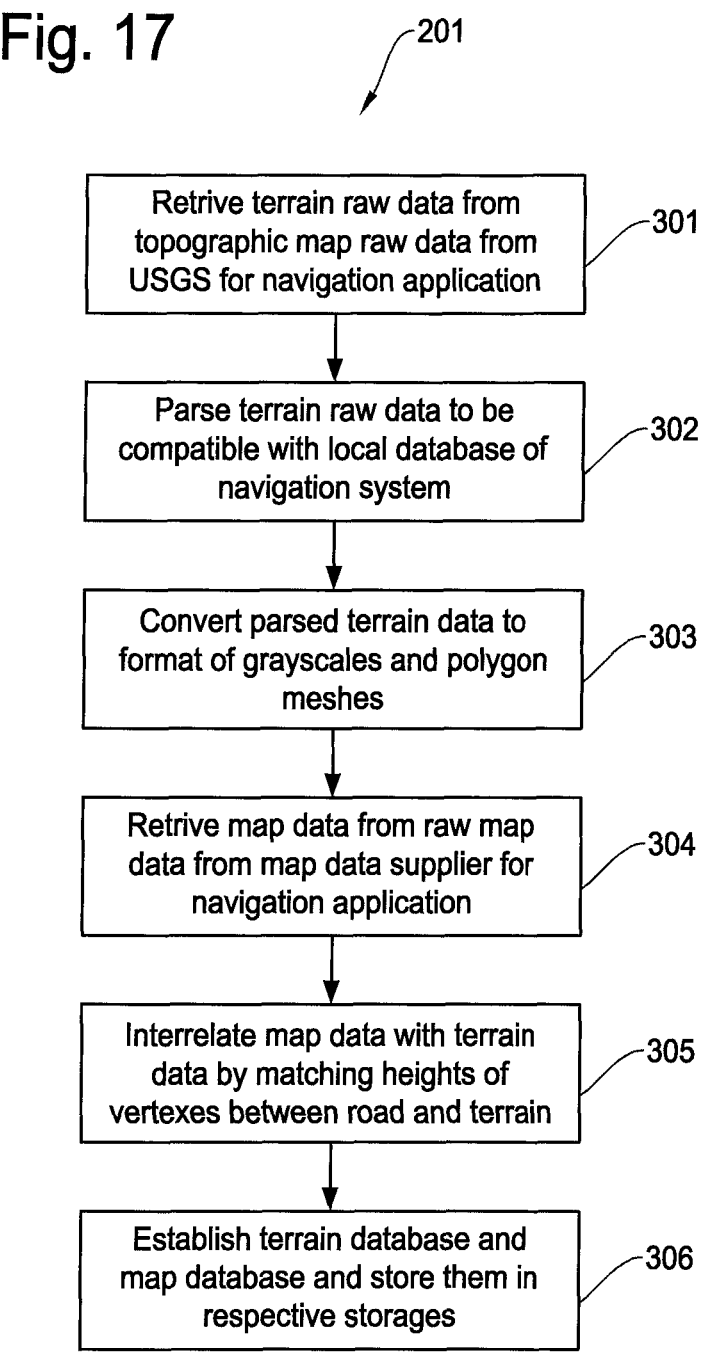
FIG. 17 is a flowchart showing operational steps of the display method of three-dimensional terrain and route guidance, which details the step 201 in the flowchart of FIG. 16 for creating and interrelating the information in the terrain database and the map database.

FIG. 17 is a flowchart showing operational steps of the display method of three-dimensional terrain and route guidance, which details the step 201 in the flowchart of FIG. 16 for creating and interrelating the information in the terrain database and the map database. As noted above, typically, the three-dimensional terrain data for the navigation application is created from the topographic map raw data provided by USGS (United States Geographical Survey) and available in the public domain. Thus, in the step 301, the process retrieves the topological map raw data provided by USGS with respect to an amount and range appropriate for the intended navigation application.

In the step 302, the retrieved topographic map data is parsed to an appropriate density (pixels or data points per mesh) and converted to a format appropriate to the terrain data storage 130 of the navigation system. As shown in FIGS. 6, 13 and 14A-14B, the terrain data is divided into a plurality of map meshes (mesh boxes). Further, in the step 303, the converted terrain data is further converted to grayscale data with respect to each data point (i.e., horizontal location, pixel) of the three-dimensional terrain so that the three-dimensional image will be expressed by shadings. As is known in the art, the grayscale data includes only intensity information where the degree of intensity represents elevation (height) of the terrain at each location (data point) thereof.

To be compatible between the terrain data and the map data so as to avoid the conventional mismatching problem such as the "dig into" or "fly above" problem arises between the roads and terrain, the process modifies the map data in view of the terrain data. First, in the step 304, the map data is retrieved from the raw map data typically provided by a map data supplier and is converted to the format (ex. hierarchical layers and meshes) appropriate to the navigation application as shown in FIGS. 10A. The above operation in the step 304 for the map data is basically the same as that of the conventional process for creating the map data for navigation systems.

In the step 305, the map data is further modified so that the terrain data and the map data are interrelated with one another by, for example, in terms of height at locations proximate to one another. More specifically, the map data is modified so that a vertex of each road matches the corresponding height of the terrain at the most proximate location with one another so that the road follows contours of the terrain. Thus, in the step 306, the terrain database and the map database are established and stored in the respective storages, i.e., the terrain data storage 130 and the map data storage 131 in FIG. 5.

Figure 18:
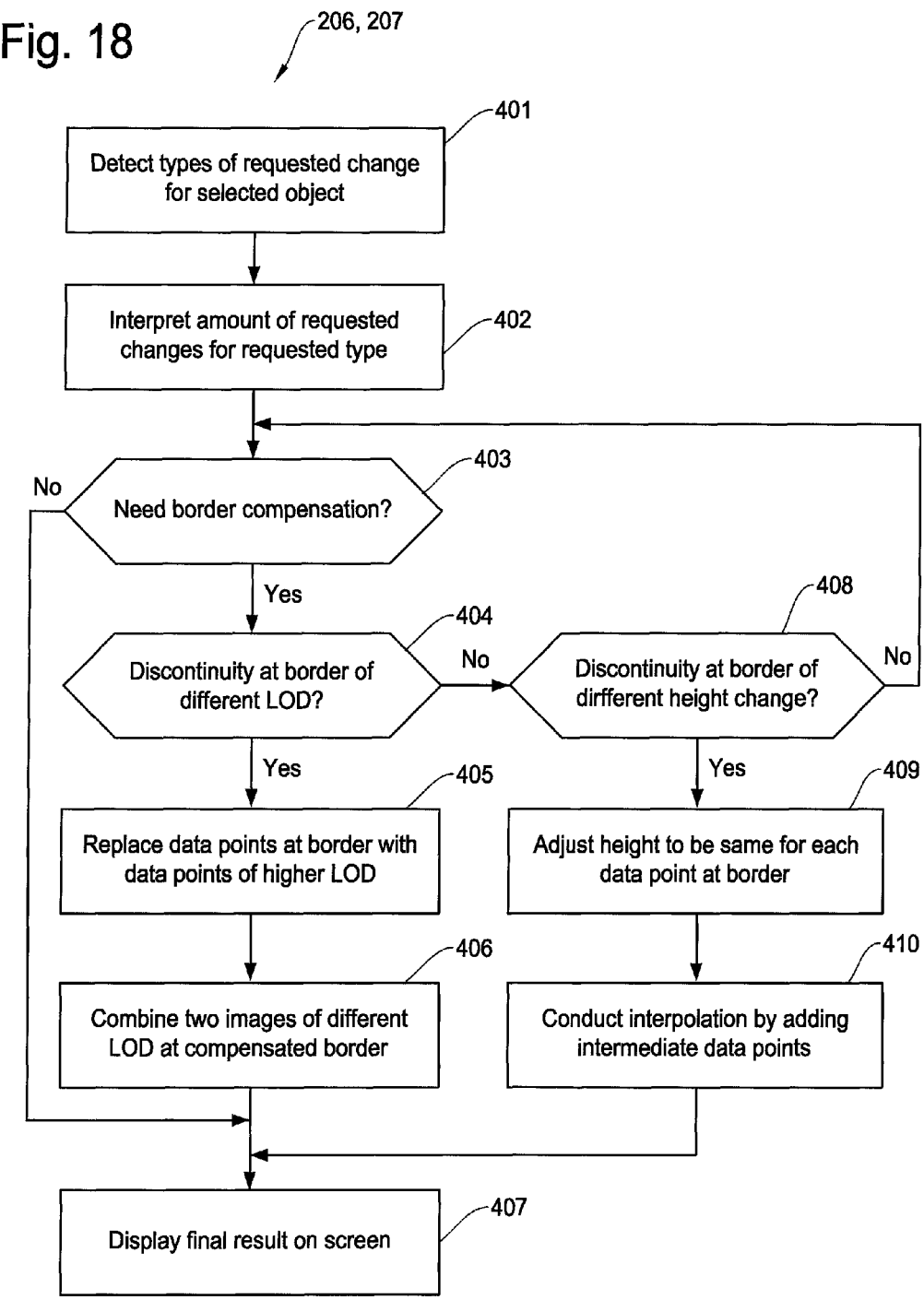
FIG. 18 is a flowchart showing operational steps of the display method of three-dimensional terrain and route guidance, which details the steps 206 and 207 in the flowchart of FIG. 16 for applying the requested changes and displaying the three-dimensional terrain and map image with changed parameters and border compensation.

FIG. 18 is a flowchart showing operational steps of the display method of three-dimensional terrain and route guidance, which details the steps 206 and 207 in the flowchart of FIG. 16, i.e., the operations of implementing the requested changes and displaying the three-dimensional terrain and map image with changed parameters and border compensation. In the step 401, the process detects the type (parameter) of changes requested by the user or the navigation system, i.e., either one of a viewing angle, a height, or a level of details (LOD) of the three-dimensional object, or a combination of two or more types. In the step 402, the process interprets the amount of requested changes for the detected parameter. Typically, the steps 401 and 402 noted above are conducted based on the detected movements of the user's fingers on the touch screen, such as directions, distances, numbers of tapping, etc.

In the step 403, the process determines whether the border compensation such as stitching is necessary at a boarder of images when incorporating the requested changes. This determination can be made based on a degree of difference in height at a border between the changed image and the unchanged image, or a degree of difference in LOD (level of details) at a border between the changed image and the unchanged image. If the degree of difference is large, the process determines that the border compensation is necessary. However, even if the difference is large, the process may determine that the border compensation is unnecessary in such a case where, for example, a display scale is so large that such a difference is insignificant or not discernible on the monitor screen.

In the foregoing step 403, if it is determined that the border compensation is not necessary, the process moves to the step 407 to display the final result of the three-dimensional terrain and route guidance on the monitor. However, if it is determined that the border compensation is necessary, the process moves to the step 404 to determine the type of discontinuity at the border. In this example, the process determines whether the discontinuity at the border is caused by the different LOD between the changed image and the unchanged image.

In the step 404, if it is determined that the discontinuity at the border is caused by the different LOD, the process moves to the step 405. Here, the process replaces the data points of the lower LOD image (meshes) with the data points of the corresponding higher LOD image (meshes). The example of operation for replacing the data points between the different terrain or map meshes of different LOD is described with reference to FIGS. 11A-11B and 12. Then, in the step 406, the process combines the two images of different LOD, the final result of which is displayed on the monitor in the step 407. Since the data points at the transition points between the different LOD scenes match with one another, the discontinuity at the border can be compensated.

In the foregoing step 404, if it is determined that the discontinuity at the border is not caused by the different LOD, the process moves to the step 408. Here, the process determines whether the discontinuity at the border is caused by the different height between the changed image and the unchanged image. If the result of determination is "No", the process goes back to the step 403 to repeat the above noted steps 403, 404 and 408.

In the foregoing step 408, if it is determined that the discontinuity at the border is caused by the different heights, the process moves to the step 409. Here, the process adjusts the heights (grayscales) of the data points at the border causing such discontinuity to be identical to one another at each data point. The example of operation for adjusting the heights at the data points between the different terrain or map meshes is described with reference to FIGS. 13 and 14A-14B.

Further, in the step 410, the process conducts an interpolation operation for the intermediate region between the data point whose height has been adjusted and an arbitrally selected data point. In the interpolation, data points (pixels) are added in the intermediate region where intermediate values (grayscales) are established for the added data points. This compensation process will be conducted for all of the data points at the border area between the terrain meshes of discontinuous heights as shown in FIGS. 14A and 143. Then, in the step 407, the final result of which is displayed on the monitor in the step 407 where the discontinuity at the border can be compensated. Note that the steps 404-406 and the steps 408-410 are interchangeable with one another.

FIG. 19 is a functional block diagram showing an example of structure of a navigation system incorporated in a vehicle to implement the display method and apparatus for three-dimensional terrain and route guidance. As noted above, in addition to the vehicle navigation system, the display method and apparatus disclosed in this application can also be applicable to various other electronics devices such as a cellular phone (smart phone), a PDA (portable digital assistant), a tablet terminal, a laptop computer, a wrist watch, etc. having a navigation function. Note that the functional blocks or components similar or identical to those in the block diagram of FIG. 5 are denoted by the same reference numbers.

In the block diagram of FIG. 19, the navigation system includes a terrain data storage 130 for storing the terrain data and a map data storage 131 for storing the map data. The terrain data and the map data are created for the application of three-dimensional display as described with reference to FIGS. 5 and 6. The terrain data storage 130 and the map data storage 131 are typically configured by DVD, CD-ROM, hard disc, semiconductor memory, or other storage medium. The navigation system includes a map & terrain memory 134 for storing an amount of data retrieved from the terrain data storage 130 and the map data storage 131 that are necessary for current operations.

The navigation system further includes a position measuring device 133 for measuring the current vehicle or user position. For example, the position measuring device 133 has a vehicle speed sensor for detecting a moving distance, a gyroscope for detecting a moving direction, a GPS (global positioning system) receiver for receiving GPS signals from satellites, a microprocessor for calculating the current position based on the above noted distance, direction, and GPS signals, and etc.

The block diagram of FIG. 19 further includes an input device, typically a touch sensor 137 and a sensor interface 138 for executing a menu selection operation, an enlarge/reduce operation, a destination input operation, as well as selecting a three-dimensional object and changing the parameters of the object according to the embodiments disclosed in the foregoing. Typically, the touch sensor 137 is formed on a surface of a monitor 150, which works as a graphic user interface (GUI), so that the user touches, taps, and drags a displayed menu, mark, or button, etc. on the monitor screen to input or select desired information. The sensor interface 138 interprets the operation of the touch sensor 137 based on locations on the screen, shapes, time lengths, numbers of tapping, directions, etc. of the finger movements of the user made on the monitor screen 150. Although a touch sensor is a typical example of input device, the navigation system may include various other input methods, such as a remote controller, to achieve the same and similar operations done through the touch sensor.

In FIG. 19, the navigation system further includes a bus 136 for interfacing the above units in the system, a control unit (processor, CPU) 139 for controlling an overall operation of the navigation system, a ROM 140 for storing various control programs such as a route search program and a map matching program necessary for navigation control, a RAM 141 for storing a processing result such as a guidance route, a display controller 143 for generating terrain and map images, a map guide image, and an arrow guide image, a wireless transmitter 149 for wireless communication to retrieve data from a remote server, and a buffer memory 148 for temporally storing data involving the data processing.

The navigation system preferably includes a vehicle sensor which is typically a sensor system for collision avoidance and warning. For such a purpose, the vehicle sensor may be configured by a distance sensor such as a Radar for measuring a distance between the user's vehicle and other vehicles, and an image sensor such as a far infrared camera to detect and distinguish objects. With respect to the display method and apparatus for three-dimensional terrain and route guidance directed to this application, the vehicle sensor may also include an angle sensor and an elevation sensor to measure a heading angle and vertical position of the vehicle which may be used for automatically adjusting a viewing angle of the three-dimensional object displayed on the monitor 150.

In the example of FIG. 19, the navigation system further includes a plurality of control units to achieve the unique functions of embodiments disclosed by the present application. As noted above with reference to FIG. 5, such functions include changing a height of the object, changing a viewing angle of the object, selecting a level of details (LOD), and compensating border discontinuity. More specifically, the navigation system includes a terrain height control unit 151 for displaying a three-dimensional image of a selected terrain with a desired height as shown in FIGS. 2B, 3B and 4B, and a viewing angle control unit 152 for displaying a three-dimensional image of a selected terrain with a desired viewing angle as shown in FIGS. 2A and 4A.

Moreover, the navigation system includes an LOD (level of detail) selection unit 153 unit for displaying a three-dimensional image of a selected terrain or road map with a desired level of details and controlling two or more different LODs simultaneously in a manner described with reference to FIGS. 4B and 10A-10B. The navigation system further includes a border compensation unit 154 for compensating discontinuity at a border of two images with different heights, viewing angles, LOD, etc., as shown in FIGS. 12 and 14A-14B.

As has been described above, according to the embodiments disclosed in the present application, the method and system achieves a flexible and high detail three-dimensional display by enabling to change the parameters, such as a viewing angle of a selected three-dimensional object, a height of a selected three-dimensional object, and a level of details (LOD) of a selected part of the image. The method and system also enables to compensate discontinuity, if any, at a border portion of two or more images where such parameters have been changed. Since such a change is made only a selected portion or object on the three-dimensional image, a computation power, memory space or other resources of the navigation system may not be overburdened by such operations.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for displaying three-dimensional terrains and map information in a three-dimensional rendering environment, comprising the following steps of:
   providing a terrain database which stores terrain data representing three-dimensional geographical information on terrains;
   providing a map database which stores map data representing three-dimensional map information on routes and road networks, the map data being arranged to interrelate with the terrain data;
   retrieving, by using a processor, the terrain data from the terrain database and the map data from the map database for three-dimensional display;
   displaying three-dimensional images of the routes and terrains on a monitor based on the retrieved terrain data and map data; and
   changing a parameter of the three-dimensional image of a selected object displayed on the monitor where the parameter includes a height, a viewing angle, and a level of details (LOD) of the selected object.

2. The method for displaying three-dimensional terrains and map information as defined in claim 1, wherein the step of providing the terrain database includes the following steps of:
   retrieving topographic map data available in a public domain;
   converting the topographic map data for a purpose of navigation operation by changing the topographic map data to grayscale data which represent elevation information of a terrain, and
   configuring the terrain database in a form of a plurality of terrain meshes where each terrain mesh is defined by a plurality of data points each representing a grayscale of a terrain.

3. The method for displaying three-dimensional terrains and map information as defined in claim 2, wherein the step of providing the map database includes the following steps of:
   configuring the map data in a multi-layered structure where a plurality of data layers with different levels of details (LODs) are arranged in a hierarchy manner where each data layer is configured by a plurality of map meshes each being defined by a plurality of data points; and
   modifying the map data to be compatible with the terrain data with respect to height such that a vertex of each road matches a corresponding height of the terrain at a most proximate location with one another so that a road follows contours of the terrain.

4. The method for displaying three-dimensional terrains and map information as defined in claim 1, wherein the step of changing the parameter of the three-dimensional image of the selected object includes a step of allowing a user to change the parameter of the three-dimensional image freely and continuously.

5. The method for displaying three-dimensional terrains and map information as defined in claim 1, wherein the step of changing the parameter of the three-dimensional image of the selected object includes a step of allowing the three-dimensional rendering environment to automatically change the parameters of the three-dimensional image based on predetermined conditions.

6. The method for displaying three-dimensional terrains and map information as defined in claim 1, wherein the step of changing the parameter of the three-dimensional image of the selected object includes a step of either displaying a tool for the user to change the parameter where the tool includes icons of an indicator and an arrow related to the parameter or allowing the user to change the parameter by finger actions of the user on a touch sensor on the monitor without displaying the tool.

7. The method for displaying three-dimensional terrains and map information as defined in claim 1, wherein the step of changing the parameter of the three-dimensional image of the selected object includes a step of displaying a three-dimensional image of an object that was not visible before changing the parameter because the object was hidden by the three-dimensional image of the selected object.

8. The method for displaying three-dimensional terrains and map information as defined in claim 4, wherein the step of changing the parameter of the three-dimensional image of the selected object includes a step of conducting a border compensation operation at a boarder of images when the border suffers discontinuity of images as a result of the changes of the parameter.

9. The method for displaying three-dimensional terrains and map information as defined in claim 8, wherein the step of conducting the border compensation operation includes a step of replacing the data points of a lower LOD terrain or map mesh with the data points of a corresponding higher LOD terrain or map mesh, and a step of combining the meshes of different LOD thereby stitching two or more images of different LODs.

10. The method for displaying three-dimensional terrains and map information as defined in claim 8, wherein the step of conducting the border compensation operation includes a step of adjusting grayscales of the data points at the boarder suffering the discontinuity of images to be identical to one another, and a step of conducting an interpolation operation for an intermediate region between the data point whose grayscale has been adjusted and an arbitrally selected data point.

11. A display apparatus for displaying three-dimensional terrains and map information in a three-dimensional rendering environment, comprising:
   a terrain database which stores terrain data representing three-dimensional geographical information on terrains;
   a map database which stores map data representing three-dimensional map, information on routes and road networks, the map data being arranged to interrelate with the terrain data;
   a control unit for controlling an overall operation of the display apparatus, the control unit retrieving the terrain data from the terrain database and the map data from the map database for three-dimensional display; and
   a monitor which displays three-dimensional images of the routes and terrains based on the retrieved terrain data and map data;
   wherein the display apparatus is configured to allow a user to change a parameter of the three-dimensional image of a selected object displayed on the monitor where the parameter includes a height, a viewing angle, and a level of details (LOD) of the selected object.

12. The display apparatus for displaying three-dimensional terrains and map information as defined in claim 11, wherein the terrain database is created by retrieving topographic map data available in a public domain, converting the topographic map data for a purpose of navigation operation by changing the topographic map data to grayscale data which represent elevation information of a terrain, and configuring the terrain database in a form of a plurality of terrain meshes where each terrain mesh is defined by a plurality of data points each representing a grayscale of a terrain.

13. The display apparatus for displaying three-dimensional terrains and map information as defined in claim 12, wherein the map database is created by configuring the map data in a multi-layered structure where a plurality of data layers with different levels of details (LODs) are arranged in a hierarchy manner where each data layer is configured by a plurality of map meshes each being defined by a plurality of data points, and modifying the map data to be compatible with the terrain data with respect to height such that a vertex of each road matches a corresponding height of the terrain at a most proximate location with one another so that a road follows contours of the terrain.

14. The display apparatus for displaying three-dimensional terrains and map information as defined in claim 11, wherein the display apparatus allows the user to manually change the parameter of the three-dimensional image of the selected object freely and continuously.

15. The display apparatus for displaying three-dimensional terrains and map information as defined in claim 11, wherein the display apparatus allows the three-dimensional rendering environment to automatically change the parameter of the three-dimensional image of the selected object based on predetermined conditions.

16. The display apparatus for displaying three-dimensional terrains and map information as defined in claim 11, wherein, when changing the parameter of the three-dimensional image of the selected object, the display apparatus either displays a tool for the user to change the parameter where the tool includes icons of an indicator and an arrow related to the parameter, or allows the user to change the parameter by finger actions of the user on a touch sensor on the monitor without displaying the tool.

17. The display apparatus for displaying three-dimensional terrains and map information as defined in claim 11, wherein, when changing the parameter of the three-dimensional image of the selected object, the display apparatus displays a three-dimensional image of an object that was not visible before changing the parameter because the object was hidden by the three-dimensional image of the selected object.

18. The display apparatus for displaying three-dimensional terrains and map information as defined in claim 14, wherein, when changing the parameter of the three-dimensional image of the selected object, the display apparatus conducts a border compensation operation at a boarder of images when the border suffers discontinuity of images as a result of the changes of the parameter.

19. The display apparatus for displaying three-dimensional terrains and map information as defined in claim 18, wherein, when conducting the border compensation operation, the display apparatus replaces the data points of a lower LOD terrain or map mesh with the data points of a corresponding higher LOD terrain or map mesh, and combines the meshes of different LOD thereby stitching two or more images of different LODs.

20. The display apparatus for displaying three-dimensional terrains and map information as defined in claim 18, wherein, when conducting the border compensation operation, the display apparatus adjusts grayscales of the data points at the boarder suffering the discontinuity of images to be identical to one another, and conducts an interpolation operation for an intermediate region between the data point whose grayscale has been adjusted and an arbitrally selected data point.

* * * * *